United States Patent
Choo et al.

(10) Patent No.: US 12,019,916 B2
(45) Date of Patent: Jun. 25, 2024

(54) METHOD OF SCHEDULING COMMANDS FOR MEMORY DEVICE AND MEMORY SYSTEM PERFORMING THE SAME

(71) Applicant: SAMSUNG ELECTRONICS CO., LTD., Suwon-si (KR)

(72) Inventors: Kiman Choo, Hwaseong-si (KR); Wooseong Cheong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 15 days.

(21) Appl. No.: 17/839,300

(22) Filed: Jun. 13, 2022

(65) Prior Publication Data
US 2023/0130884 A1    Apr. 27, 2023

(30) Foreign Application Priority Data

Oct. 26, 2021    (KR) .................. 10-2021-0143198

(51) Int. Cl.
*G06F 3/06*    (2006.01)
*G06F 13/16*    (2006.01)
*G06F 13/40*    (2006.01)

(52) U.S. Cl.
CPC .......... *G06F 3/0659* (2013.01); *G06F 3/0604* (2013.01); *G06F 3/0679* (2013.01); *G06F 13/1657* (2013.01); *G06F 13/404* (2013.01)

(58) Field of Classification Search
CPC .... G06F 3/0659; G06F 3/0604; G06F 3/0679; G06F 3/0611; G06F 13/1657; G06F 13/404; G06F 3/0656; G06F 3/0658; G06F 12/0292

See application file for complete search history.

(56) References Cited

U.S. PATENT DOCUMENTS

| | | | |
|---|---|---|---|
| 8,555,000 B2 | 10/2013 | Jo et al. | |
| 8,667,229 B2 | 3/2014 | Lin | |
| 9,870,172 B2 | 1/2018 | Ward et al. | |
| 10,223,005 B2 | 3/2019 | Huang et al. | |
| 10,437,482 B2 | 10/2019 | Chang et al. | |
| 2017/0352403 A1 | 12/2017 | Lee et al. | |
| 2020/0379684 A1* | 12/2020 | Subbarao | G06F 3/0683 |
| 2022/0027069 A1* | 1/2022 | Henze | G06F 3/0619 |

FOREIGN PATENT DOCUMENTS

| | | | | |
|---|---|---|---|---|
| CN | 115757208 A | * | 3/2023 | ......... G06F 12/0246 |
| KR | 1453039 A | | 2/2014 | |

* cited by examiner

*Primary Examiner* — Masud K Khan
(74) *Attorney, Agent, or Firm* — Fish & Richardson P.C.

(57) ABSTRACT

In a method of scheduling commands for a memory device including a plurality of storage regions, a plurality of host commands used to access the plurality of storage regions are received from a host device. The plurality of host commands are queued in a first command queue. A first scheduling associated with the plurality of host commands is performed based on a mapping table and operation states of the plurality of storage regions. The mapping table includes a correspondence between the plurality of host commands and the plurality of storage regions. The plurality of host commands are executed based on a result of the first scheduling. In response to a bank collision occurring while the plurality of host commands are executed, a second scheduling associated with the plurality of host commands is performed.

19 Claims, 29 Drawing Sheets

FIG. 11

| LOGICAL ADDRESS | PHYSICAL ADDRESS | STORAGE REGION |
|---|---|---|
| LA1 | PA1 | SR11 |
| LA2 | PA2 | SR21 |
| LA3 | PA3 | SR11 |
| LA4 | PA4 | SR31 |
| LA5 | PA5 | SR12 |
| LA6 | PA6 | SR21 |
| LA7 | PA7 | SR41 |
| LA8 | PA8 | SR22 |
| LA9 | PA9 | SR31 |
| LA10 | PA10 | SR42 |
| LA11 | PA11 | SR41 |
| LA12 | PA12 | SR31 |
| ⋮ | ⋮ | ⋮ |

METHOD OF SCHEDULING COMMANDS FOR MEMORY DEVICE AND MEMORY SYSTEM PERFORMING THE SAME

CROSS-REFERENCE TO RELATED APPLICATION

This application claims priority under 35 USC § 119 to Korean Patent Application No. 10-2021-0143198 filed on Oct. 26, 2021, in the Korean Intellectual Property Office (KIPO), the contents of which are herein incorporated by reference in their entirety.

BACKGROUND

1. Technical Field

Example embodiments relate generally to semiconductor integrated circuits and more particularly to methods of scheduling commands for memory devices and memory systems performing the methods of scheduling commands.

2. Description of the Related Art

Semiconductor memory devices can generally be divided into two categories depending upon whether they retain stored data when disconnected from a power supply. These categories include volatile memory devices, which lose stored data when disconnected from power, and nonvolatile memory devices, which retain stored data when disconnected from power. Volatile memory devices may perform read and write operations at a high speed, while contents stored therein may be lost at power-off. Nonvolatile memory devices may retain contents stored therein even at power-off, which means they may be used to store data that must be retained regardless of whether they are powered.

Semiconductor memory devices may be controlled by memory controllers, and the memory controllers may control operations of the semiconductor memory devices based on a plurality of requests and/or commands from host devices. Researchers have developed various schemes to handle the requests and/or commands received from the host devices.

SUMMARY

At least one example embodiment of the present disclosure provides a method of scheduling commands capable of efficiently managing a plurality of commands used for an operation of a memory device and a bank collision.

At least one example embodiment of the present disclosure provides a memory system that performs the method of scheduling commands.

According to example embodiments, in a method of scheduling commands for a memory device including a plurality of storage regions, a plurality of host commands used to access the plurality of storage regions are received from a host device. The plurality of host commands are queued in a first command queue. A first scheduling associated with the plurality of host commands is performed based on a mapping table and operation states of the plurality of storage regions. The mapping table includes a correspondence between the plurality of host commands and the plurality of storage regions. The plurality of host commands are executed based on a result of the first scheduling. In response to a bank collision occurring while the plurality of host commands are executed, a second scheduling associated with the plurality of host commands is performed.

According to example embodiments, a memory system includes at least one memory device and a memory controller. The at least one memory device includes a plurality of storage regions. The memory controller controls an operation of the at least one memory device and includes a first command queue, a host interface, a buffer memory, a first scheduler, a command executor, and a second scheduler. The host interface receives a plurality of host commands used to access the plurality of storage regions from a host device and queues the plurality of host commands in the first command queue. The buffer memory stores a mapping table including a correspondence between the plurality of host commands and the plurality of storage regions. The first scheduler performs a first scheduling associated with the plurality of host commands based on the mapping table and operation states of the plurality of storage regions. The command executor executes the plurality of host commands based on a result of the first scheduling. The second scheduler performs a second scheduling associated with the plurality of host commands in response to a bank collision occurring while the plurality of host commands are executed.

According to example embodiments, in a method of scheduling commands for a nonvolatile memory device including a plurality of storage regions, a plurality of host commands used to access the plurality of storage regions are sequentially received from a host device. The plurality of host commands are queued in a first command queue based on a first order. A pre-scheduling associated with the plurality of host commands is performed based on a mapping table and operation states of the plurality of storage regions such that the plurality of host commands have a second order different from the first order. The mapping table includes a correspondence between the plurality of host commands and the plurality of storage regions. The plurality of host commands are executed based on a result of the pre-scheduling. In response to a bank collision occurring while the plurality of host commands are executed, a post-scheduling associated with the plurality of host commands is performed based on the mapping table and the operation states of the plurality of storage regions. The plurality of host commands are re-executed based on a result of the post-scheduling. When performing the pre-scheduling, each address corresponding to each host command is checked based on the mapping table. An operation state of each storage region corresponding to each address is checked. In response to the operation state of each storage region corresponding to an idle state, an execution order of each host command is maintained. In response to the operation state of each storage region corresponding to a busy state, the execution order of each host command is delayed. When performing the post-scheduling, an execution of one of host commands in which the bank collision occurs is aborted. An execution order of the aborted host command is delayed.

In the method of scheduling commands and the memory system according to example embodiments, an inter-scheduling may be performed before and/or while the plurality of host commands is executed. For example, the first scheduling (e.g., the pre-scheduling) and/or the second scheduling (e.g., the post-scheduling) associated with the plurality of host commands may be performed based on the operation states of the plurality of storage regions. Accordingly, the bank collision may be prevented and/or avoided and the performance of the memory device may be improved or enhanced.

BRIEF DESCRIPTION OF THE DRAWINGS

Illustrative, non-limiting example embodiments will be more clearly understood from the following detailed description taken in conjunction with the accompanying drawings.

FIGS. 10, 11, 12A, 12B, 12C, 12D, 12E, 12F, 12G and 12H are diagrams for describing operations of FIGS. 6, 7, 8 and 9.

DETAILED DESCRIPTION OF THE EMBODIMENTS

Figure 1:
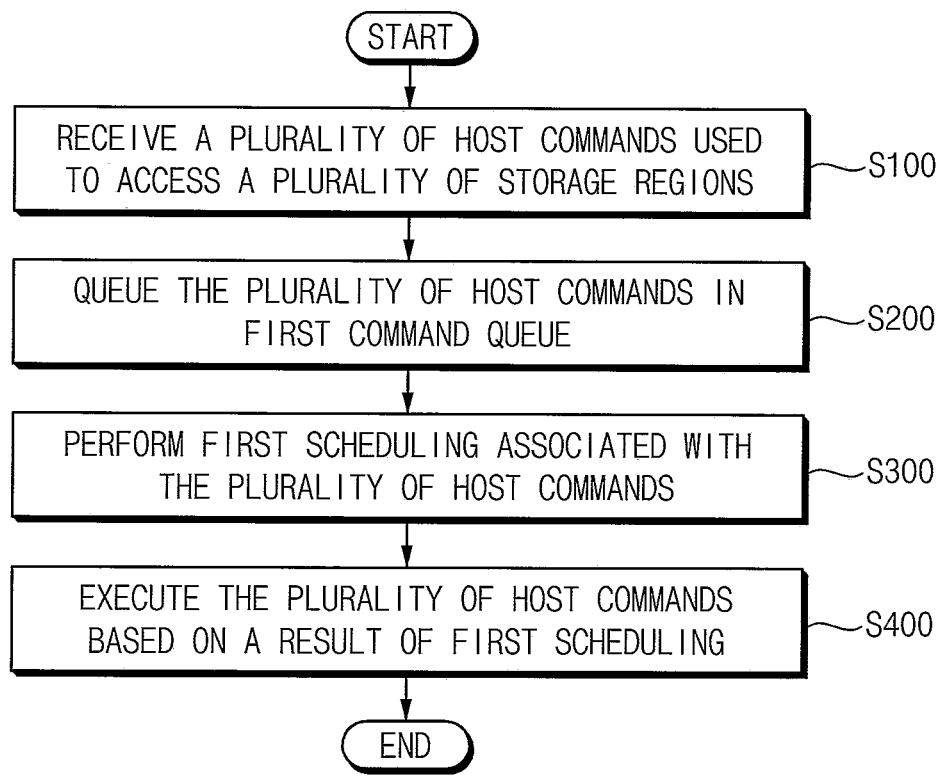
FIG. 1 is a flowchart illustrating a method of scheduling commands according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of scheduling commands according to example embodiments.

Referring to FIG. 1, a method of scheduling commands according to example embodiments is performed by a memory system that includes at least one memory device and a memory controller. The memory device includes a plurality of storage regions, and the memory controller controls an operation of the memory device. The memory system operates based on commands, control signals, power supply voltages, or the like that are received from a host device located outside the memory system and exchanges data with the host device. Detailed configurations of the memory device, the memory controller, and the memory system will be described with reference to FIGS. 2 through 5.

In the method of scheduling commands according to example embodiments, the memory controller sequentially receives a plurality of host commands, which are used to access the plurality of storage regions included in the memory device, from the host device (step S100). For example, the plurality of host commands may include a read command for retrieving data stored in the memory device, a write command for storing data in the memory device, or the like. The plurality of host commands may be referred to as input/output (I/O) requests, or simply requests.

The plurality of host commands are queued in a first command queue included in the memory controller (step S200). For example, the plurality of host commands may be queued based on a first order or a queuing may be performed such that the plurality of host commands have a first order. For example, the first order may correspond to an order of receiving the plurality of host commands. For example, the plurality of host commands may be sequentially queued in the first command queue based on a first-in first-out (FIFO) scheme.

The memory controller performs a first scheduling associated with (or related to) the plurality of host commands based on a mapping table and operation states of the plurality of storage regions (step S300). The mapping table includes a correspondence (or relationship) between the plurality of host commands and the plurality of storage regions. For example, the first scheduling may be performed such that the plurality of host commands have a second order different from the first order. For example, the second order may correspond to an order of executing the plurality of host commands. For example, the plurality of host commands may include a plurality of logical addresses, the plurality of storage regions may have a plurality of physical addresses, and the mapping table may include a correspondence (or relationship) between the plurality of logical addresses and the plurality of physical addresses. For example, each storage region may have a busy state when each storage area is in use and may have an idle state when each storage area is not in use. An execution order of the plurality of host commands may be determined when the first scheduling is performed. The first scheduling may be performed before the plurality of host commands are executed and, thus, may be referred to as a pre-scheduling.

The memory controller executes the plurality of host commands based on a result of the first scheduling (step S400). For example, a plurality of memory commands that correspond to the plurality of host commands may be executed based on the second order and data write and/or read operations may be performed on the memory device.

In some example embodiments, as will be described with reference to FIG. 6, the first scheduling may be sequentially performed on the plurality of host commands and the plurality of host commands may be sequentially executed. In other example embodiments, as will be described with reference to FIG. 13, the first scheduling may be substantially simultaneously (or concurrently) performed on the plurality of host commands and at least some of the plurality of host commands may be substantially simultaneously executed.

In some example embodiments, as will be described with reference to FIG. 3A, the plurality of storage regions may be included in a plurality of memory devices. In some example embodiments, as will be described with reference to FIG. 3B, the plurality of storage regions may be included in a single memory device.

In a certain situation (e.g., a random read operation), when host commands are concentrated on a specific storage region, e.g., when host commands (or requests) for the specific storage region are sequentially and continuously received, a bank collision in which the specific storage region is unavailable may occur. Conventionally, host commands are sequentially executed in an order of receiving the host commands and, thus, there is a problem in that performance of a memory device is degraded or deteriorated when the bank collision occurs.

In the method of scheduling commands according to example embodiments, an inter-scheduling may be performed before the plurality of host commands are executed. For example, the first scheduling (e.g., the pre-scheduling) associated with the plurality of host commands may be performed based on the operation states of the plurality of storage regions. Accordingly, the bank collision may be prevented and/or avoided and the performance of the memory device may be improved or enhanced.

Figure 2:
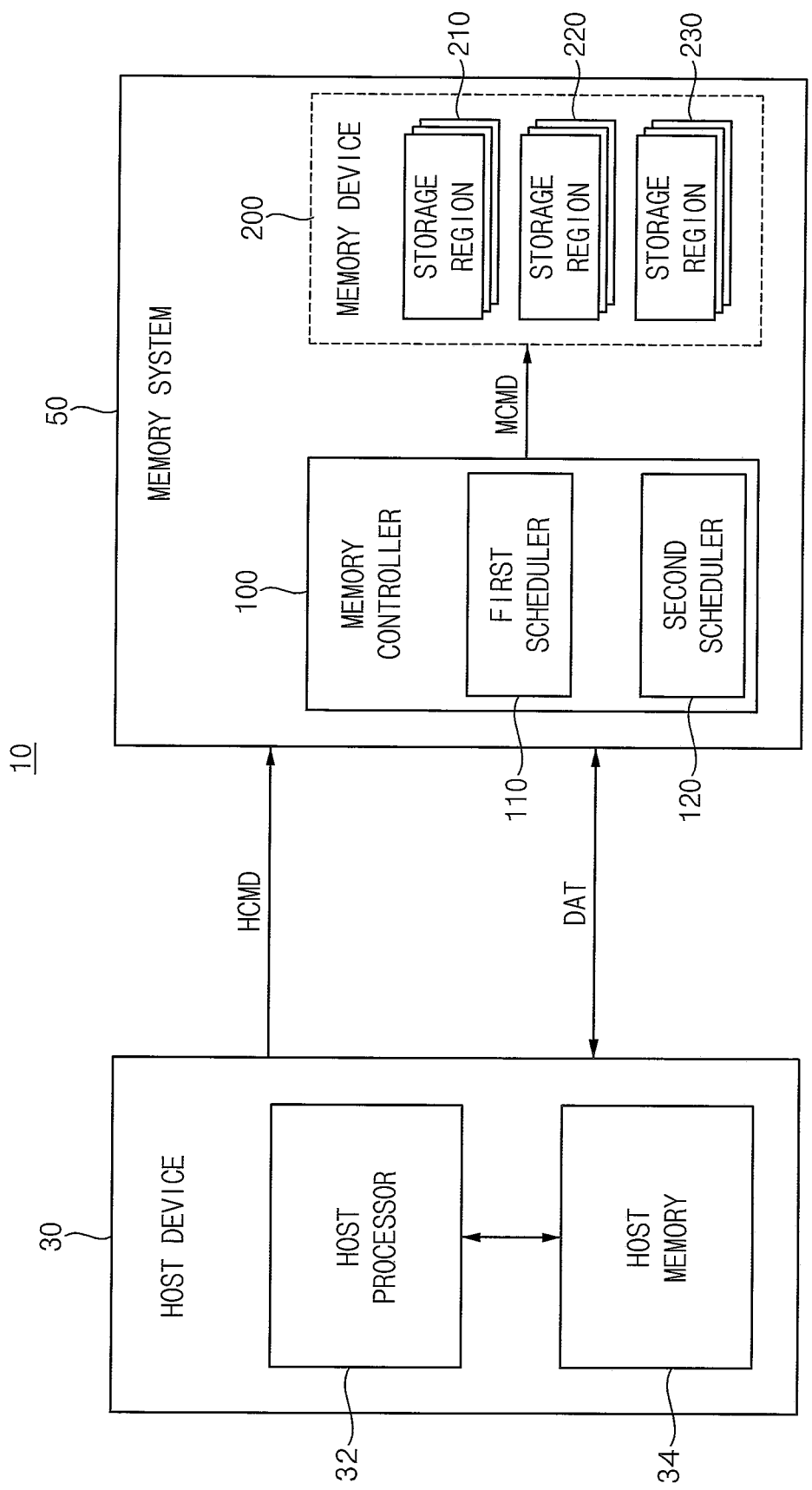
FIG. 2 is a block diagram illustrating a memory system and an electronic system according to example embodiments.

FIG. 2 is a block diagram illustrating a memory system and an electronic system according to example embodiments.

Referring to FIG. 2, an electronic system 10 includes a host device 30 and a memory system 50.

The host device 30 controls overall operations of the electronic system 10. The host device 30 may include a host processor 32 and a host memory 34.

The host processor 32 may control an operation of the host device 30. For example, the host processor 32 may execute an operating system (OS). For example, the operating system may include a file system for file management and a device driver for controlling peripheral devices including the memory system 50 at the operating system level. For example, the host processor 32 may include at least one of various processing units, e.g., a central processing unit (CPU) or the like.

The host memory 34 may store instructions and/or data that are executed and/or processed by the host processor 32. For example, the host memory 34 may include at least one of various volatile memories, e.g., a dynamic random access memory (DRAM) or the like.

The memory system 50 is accessed by the host device 30. The memory system 50 may include a memory controller 100 and at least one memory device 200.

The memory controller 100 may control an operation of the memory system 50. For example, the memory controller 100 may control an operation (e.g., a data write operation, a data read operation, or the like) of the memory device 200 based on commands and data received from the host device 30.

The memory controller 100 may perform the method of scheduling commands according to example embodiments described with reference to FIG. 1. For example, the memory controller 100 may include a first scheduler 110. The memory controller 100 may receive a plurality of host commands HCMD from the host device 30, may queue the plurality of host commands HCMD in a first command queue (e.g., a first command queue 420 in FIG. 4), may perform a first scheduling associated with the plurality of host commands HCMD using the first scheduler 110, and may execute the plurality of host commands HCMD based on a result of the first scheduling. A plurality of memory commands MCMD may be generated by executing the plurality of host commands HCMD. Based on the plurality of memory commands MCMD, data DAT that is stored in the memory device 200 may be read from the memory device 200 and transmitted to the host device 30 or data DAT that is received from the host device 30 and to be written into the memory device 200 may be transmitted to the memory device 200.

In addition, the memory controller 100 may perform a method of scheduling commands according to example embodiments, which will be described with reference to FIG. 16. For example, the memory controller 100 may further include a second scheduler 120. The memory controller 100 may further perform a second scheduling, which will be described later, using the second scheduler 120.

The memory device 200 may include a plurality of storage regions 210, 220 and 230 and may store a plurality of data. For example, the plurality of storage regions 210, 220 and 230 may store the meta data, various user data, or the like In some example embodiments, the memory device 200 may include a nonvolatile memory device. For example, the memory device 200 may include an electrically erasable programmable read only memory (EEPROM), a flash memory (e.g., a NAND flash memory), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

In some example embodiments, the memory system 50 may include a storage device. For example, the memory system 50 may be one of a solid state drive (SSD), a universal flash storage (UFS), a multi-media card (MMC), or an embedded multi-media card (eMMC). Alternatively, the memory system 50 may be one of a secure digital (SD) card, a micro SD card, a memory stick, a chip card, a universal serial bus (USB) card, a smart card, a compact flash (CF) card, or the like.

In some example embodiments, the memory system 50 may be connected to the host device 30 via a block accessible interface which may include, for example, a serial advanced technology attachment (SATA) bus, a small computer system interface (SCSI) bus, a serial attached SCSI (SAS) bus, a nonvolatile memory express (NVMe) bus, a UFS, an eMMC, or the like. The memory system 50 may use a block accessible address space corresponding to an access size of the memory device 200 to provide the block accessible interface to the host device 30, for allowing the access by units of a memory block with respect to data stored in the memory device 200.

In some example embodiments, the electronic system 10 may be any computing system, such as a personal computer (PC), a server computer, a data center, a workstation, a digital television, a set-top box, a navigation system, etc. In other example embodiments, the electronic system 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 3A:
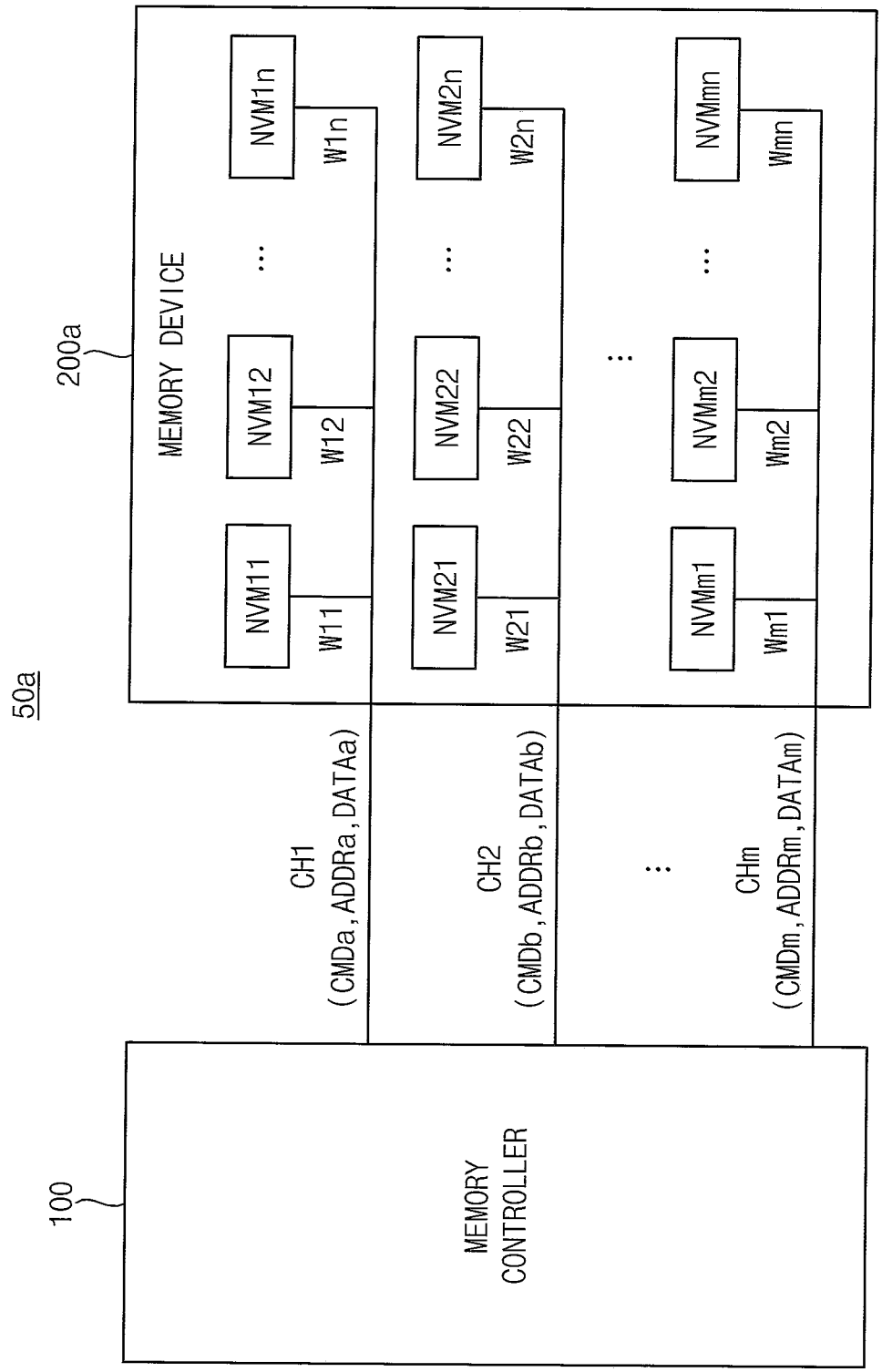
FIGS. 3A and 3B are block diagrams illustrating a memory device and a memory system including the memory device according to example embodiments.
Figure 3B:
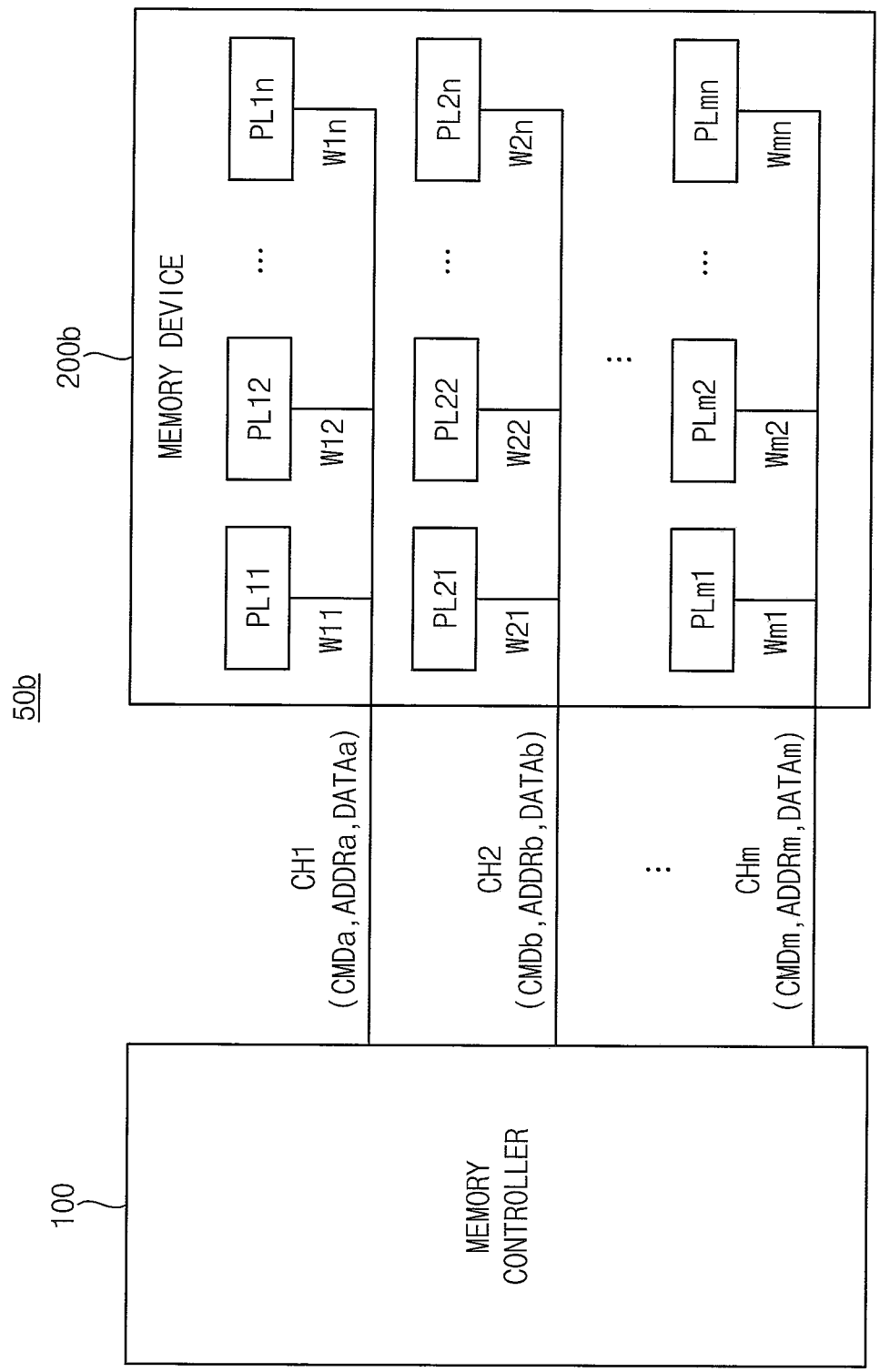

FIGS. 3A and 3B are block diagrams illustrating a memory device and a memory system including the memory device according to example embodiments.

Referring to FIG. 3A, a memory system 50a may include a memory controller 100 and a memory device 200a. The memory system 50a may support a plurality of channels CH1, CH2, . . . , CHm, and the memory device 200a may be connected to the memory controller 100 through the plurality of channels CH1 to CHm. For example, the memory system 50a may be implemented as a storage device, such as a solid state drive (SSD).

The memory device 200a may include a plurality of nonvolatile memory devices NVM11, NVM12, . . . , NVM1n, NVM21, NVM22, . . . , NVM2n, NVMm1, NVMm2, . . . , NVMmn. Each of the nonvolatile memory devices NVM11 to NVMmn may be connected to a respective one of the plurality of channels CH1 to CHm through a corresponding way. For example, the nonvolatile memory devices NVM11 to NVM1n may be connected to the first channel CH1 through ways W11, W12, . . . , W1n, the nonvolatile memory devices NVM21 to NVM2n may be connected to the second channel CH2 through ways W21, W22, . . . , W2n, and the nonvolatile memory devices NVMm1 to NVMmn may be connected to the m-th channel CHm through ways Wm1, Wm2, . . . , Wmn. In some example embodiments, each of the nonvolatile memory devices NVM11 to NVMmn may be implemented as an arbitrary memory unit that may operate according to an individual command from the memory controller 100. For example, each of the nonvolatile memory devices NVM11 to NVMmn may be implemented as a chip or a die, but example embodiments are not limited thereto.

In some example embodiments, each of the nonvolatile memory devices NVM11 to NVMmn may correspond to one of the plurality of storage regions 210, 220 and 230 in FIG. 2. In other words, FIG. 3A illustrates an example where the plurality of storage regions 210, 220 and 230 are included in a plurality of memory devices (e.g., the nonvolatile memory devices NVM11 to NVMmn), e.g., one storage region is included in one memory device.

The memory controller 100 may transmit and receive signals to and from the memory device 200a through the plurality of channels CH1 to CHm. For example, the memory controller 100 may transmit commands CMDa, CMDb, . . . , CMDm, addresses ADDRa, ADDRb, . . . , ADDRm and data DATAa, DATAb, . . . , DATAm to the memory device 200a through the channels CH1 to CHm or may receive data DATAa to DATAm from the memory device 200a.

The memory controller 100 may select one of the nonvolatile memory devices NVM11 to NVMmn, which is connected to each of the channels CH1 to CHm, by using a corresponding one of the channels CH1 to CHm and may transmit and receive signals to and from the selected nonvolatile memory device. For example, the memory controller 100 may select the nonvolatile memory device NVM11 from among the nonvolatile memory devices NVM11 to NVM1n connected to the first channel CH1. The memory controller 100 may transmit the command CMDa, the address ADDRa, and the data DATAa to the selected nonvolatile memory device NVM11 through the first channel CH1 or may receive the data DATAa from the selected nonvolatile memory device NVM11.

The memory controller 100 may transmit and receive signals to and from the memory device 200a in parallel through different channels. For example, the memory controller 100 may transmit the command CMDb to the memory device 200a through the second channel CH2 while transmitting the command CMDa to the memory device 200a through the first channel CH1. For example, the memory controller 100 may receive the data DATAb from the memory device 200a through the second channel CH2 while receiving the data DATAa from the memory device 200a through the first channel CH1.

The memory controller 100 may control overall operations of the memory device 200a. The memory controller 100 may transmit a signal to the channels CH1 to CHm and may control each of the nonvolatile memory devices NVM11 to NVMmn connected to the channels CH1 to CHm. For example, the memory controller 100 may transmit the command CMDa and the address ADDRa to the first channel CH1 and may control one nonvolatile memory device selected from among the nonvolatile memory devices NVM11 to NVM1n.

Each of the nonvolatile memory devices NVM11 to NVMmn may operate under the control of the memory controller 100. For example, the nonvolatile memory device NVM11 may program the data DATAa based on the command CMDa, the address ADDRa and the data DATAa provided from the memory controller 100 through the first channel CH1. For example, the nonvolatile memory device NVM21 may read the data DATAb based on the command CMDb and the address ADDRb provided from the memory controller 100 through the second channel CH2 and may transmit the read data DATAb to the memory controller 100 through the second channel CH2.

Although FIG. 3A illustrates an example where the memory device 200a communicates with the memory controller 100 through m channels and includes n nonvolatile memory devices corresponding to each of the channels, the number of channels and the number of nonvolatile memory devices connected to one channel may be variously determined according to example embodiments.

Referring to FIG. 3B, a memory system 50b may include a memory controller 100 and a memory device 200b.

The memory system 50b may be substantially the same as the memory system 50a of FIG. 3A, except that a configuration of the memory device 200b is modified. The descriptions repeated with FIG. 3A will be omitted.

The memory device 200b may include one nonvolatile memory device and may include a plurality of planes PL11, PL12, . . . , PL1n, PL21, PL22, . . . , PL2n, PLm1, PLm2, . . . , PLmn. Each of the planes PL11 to PLmn may be connected to a respective one of the plurality of channels CH1 to CHm through a corresponding way. For example, the planes PL11 to PL1n may be connected to the first channel CH1 through the ways W11 to W1n, the planes PL21 to PL2n may be connected to the second channel CH2 through the ways W21 to W2n, and the planes PLm1 to PLmn may be connected to the m-th channel CHm through the ways Wm1 to Wmn. In some example embodiments, each of the planes PL11 to PLmn may be implemented as an arbitrary memory unit that may operate according to an individual command from the memory controller 100. For example, each of the planes PL11 to PLmn may include a plurality of blocks, but example embodiments are not limited thereto.

In some example embodiments, each of the planes PL11 to PLmn may correspond to one of the plurality of storage regions 210, 220 and 230 in FIG. 2. In other words, FIG. 3B illustrates an example where the plurality of storage regions 210, 220 and 230 are included in one memory device (e.g., a nonvolatile memory device).

Figure 4:
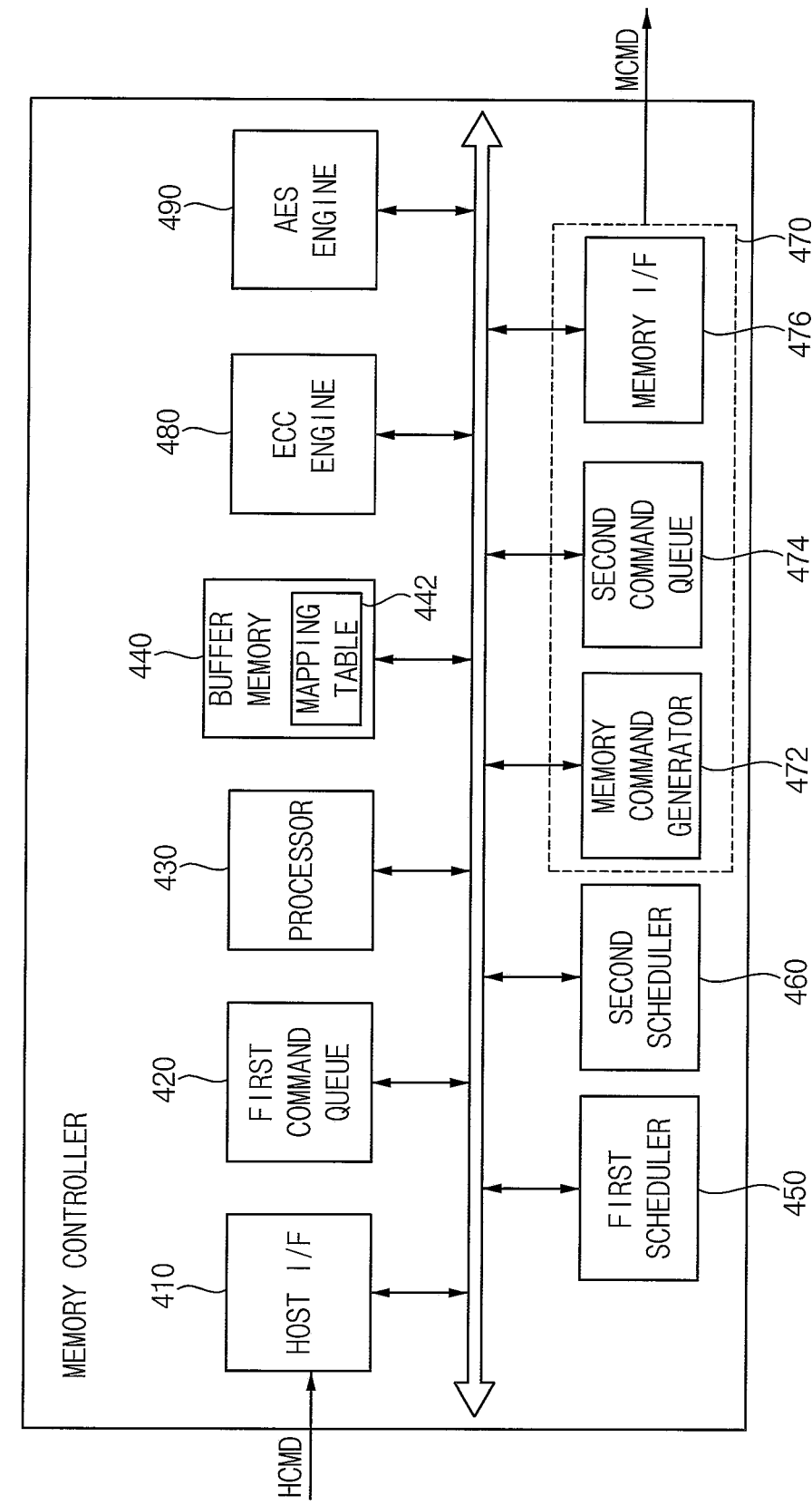
FIG. 4 is a block diagram illustrating an example of a memory controller included in a memory system according to example embodiments.

FIG. 4 is a block diagram illustrating an example of a memory controller included in a memory system according to example embodiments.

Referring to FIG. 4, a memory controller 400 may include a host interface (I/F) 410, a first command queue 420, a processor 430, a buffer memory 440, a first scheduler 450, a second scheduler 460, a command executor 470, an error correction code (ECC) engine 480 and an advanced encryption standard (AES) engine 490.

The host interface 410 may provide physical connections between a host device (e.g., the host device 30 in FIG. 2) and a memory system (e.g., the memory system 50 in FIG. 2). The host interface 410 may provide an interface corresponding to a bus format of the host device for communication between the host device and the memory system. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The host interface 410 may receive a plurality of host commands HCMD, which are used to access a plurality of storage regions (e.g., the plurality of storage regions 210, 220 and 230 in FIG. 2) included in a memory device (e.g., the memory device 200 in FIG. 2), from the host device and may queue the plurality of host commands HCMD in the first command queue 420.

In some example embodiments, although not illustrated in detail, the first command queue 420 may include a submission queue and a completion queue. For example, each of the submission queue and the completion queue may include a ring buffer. The first command queue 420 may be referred to as a host command queue.

The processor 430 may control an operation of the memory controller 400 in response to a command received via the host interface 410 from the host device. For example, the processor 430 may control an operation of the memory system and may control respective components by employing firmware for operating the memory system.

The buffer memory 440 may store instructions and data executed and processed by the processor 430. For example, the buffer memory 440 may include a volatile memory, such as a static random access memory (SRAM), a dynamic random access memory (DRAM), a cache memory, or the like.

The buffer memory 440 may store a mapping table 442. The mapping table 442 may include a correspondence between the plurality of host commands HCMD and the plurality of storage regions 210, 220 and 230. For example, the mapping table 442 may include a correspondence between logical addresses of the plurality of host commands HCMD and physical addresses of the plurality of storage regions 210, 220 and 230.

Before the plurality of host commands HCMD are executed, the first scheduler 450 may perform a first scheduling (e.g., a pre-scheduling) associated with the plurality of host commands HCMD based on the mapping table 442 and operation states of the plurality of storage regions 210, 220 and 230. The first scheduler 450 may be referred to as a pre-scheduler.

When a bank collision occurs while the plurality of host commands HCMD are executed, the second scheduler 460 may perform a second scheduling (e.g., a post-scheduling) associated with the plurality of host commands HCMD based on the mapping table 442 and the operation states of the plurality of storage regions 210, 220 and 230. The second scheduler 460 may be referred to as a post-scheduler.

The command executor 470 may execute the plurality of host commands HCMD based on results of the first scheduling and/or the second scheduling and may transmit a plurality of memory commands MCMD, which are generated by executing the plurality of host commands HCMD, to the memory device.

The command executor 470 may include a memory command generator 472, a second command queue 474 and a memory interface 476.

The memory command generator 472 may generate the plurality of memory commands MCMD corresponding to the plurality of host commands HCMD and may queue the plurality of memory commands MCMD in the second command queue 474.

In some example embodiments, the memory command generator 472 may perform a function of a flash translation layer (FTL). The FTL may perform various functions, such as an address mapping operation, a wear-leveling operation, a garbage collection operation, or the like. The address mapping operation may represent an operation of converting a logical address received from the host device into a physical address used to store data in the memory device. The wear-leveling operation may represent a technique for preventing excessive deterioration of a specific block by allowing blocks of the memory device to be uniformly used. As an example, the wear-leveling operation may be implemented using a firmware technique that balances erase counts of physical blocks. The garbage collection operation may represent a technique for ensuring usable capacity in the memory device by erasing an existing block after copying valid data of the existing block to a new block.

In some example embodiments, as with the first command queue 420, the second command queue 474 may include a submission queue and a completion queue. The second command queue 474 may be referred to as a memory command queue. For example, a size (or capacity) of the second command queue 474 may be smaller than that of the first command queue 420.

The memory interface 476 may exchange data with the memory device. The memory interface 476 may transmit a command and/or data to the memory device or may receive data read from the memory device. In some example embodiments, the memory interface 476 may be connected to the memory device via one channel. In other example embodiments, the memory interface 476 may be connected to the memory device via two or more channels. For example, the memory interface 476 may be configured to comply with a standard protocol, such as Toggle or open NAND flash interface (ONFI).

The ECC engine 480 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc. or may perform ECC encoding and ECC decoding using above-described codes or other error correction codes.

The AES engine 490 may perform at least one of an encryption operation and a decryption operation on data input to the memory controller 400 by using a symmetric-key algorithm. Although not illustrated in detail, the AES engine 490 may include an encryption module and a decryption module. In some example embodiments, the encryption module and the decryption module may be implemented as separate modules. In other example embodiments, one module capable of performing both encryption and decryption operations may be implemented in the AES engine 490.

In some example embodiments, at least a part of the memory controller 400 may be implemented as hardware. For example, at least a part of the memory controller 400 may be included in a computer-based electronic system. In other example embodiments, at least a part of the memory controller 400 may be implemented as instruction codes or program routines (e.g., a software program). For example, the instruction codes or the program routines may be executed by a computer-based electronic system and may be stored in any storage device located inside or outside the computer-based electronic system.

Figure 5:
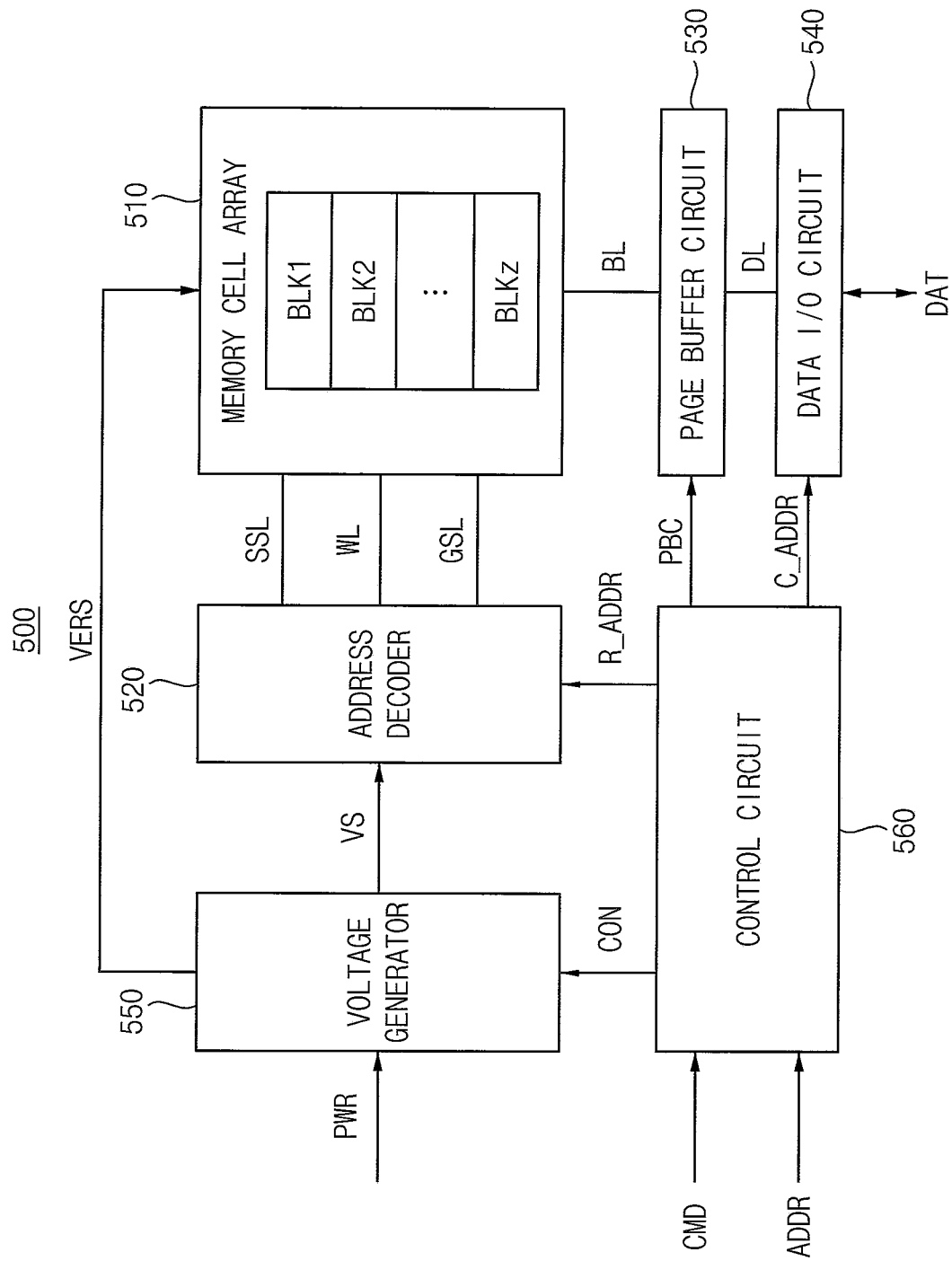
FIG. 5 is a block diagram illustrating an example of a memory device included in a memory system according to example embodiments.

FIG. 5 is a block diagram illustrating an example of a memory device included in a memory system according to example embodiments.

Referring to FIG. 5, a memory device 500 may include a memory cell array 510, an address decoder 520, a page buffer circuit 530, a data input/output (I/O) circuit 540, a voltage generator 550 and a control circuit 560. For example, the memory device 500 may be a NAND flash memory device.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the memory blocks BLK1, BLK2, . . . , BLKz may be divided into a plurality of pages and two or more of the memory blocks BLK1, BLK2, . . . , BLKz may form one plane.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure in which the three-dimensional memory array is configured as a plurality of levels with wordlines and/or bitlines shared between levels: U.S. Pat. Nos. 7,679,133; 8,553,466; 8,654,587; 8,559,235; and US Pat. Pub. No. 2011/0233648.

The control circuit 560 may receive a command CMD and an address ADDR from outside (e.g., from the memory controller 100 in FIG. 2) and may control erasure, programming, and read operations of the memory device 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL, and the plurality of ground selection lines GSL.

For example, in the data erase/write/read operations, the address decoder 520 may determine at least one of the plurality of wordlines WL as a selected wordline and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line and may determine the rest or remainder of the plurality of ground selection lines GSL other than the selected ground selection line as unselected ground selection lines, based on the row address R_ADDR.

The voltage generator 550 may generate voltages VS that are required for an operation of the memory device 500 based on a power PWR and the control signals CON. The voltages VS may be applied to the plurality of string selection lines SSL, the plurality of wordlines WL, and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from outside of the nonvolatile memory 500 to the memory cell array 510 via the page buffer circuit 530 or may provide the data DAT from the memory cell array 510 to outside of the nonvolatile memory 500, based on the column address C_ADDR.

Although the memory device and the memory controller according to example embodiments are described based on a NAND flash memory, the memory device and the memory controller according to example embodiments may be implemented based on any nonvolatile memory, e.g., a PRAM, an RRAM, an NFGM, a PoRAM, an MRAM, an FRAM, or the like.

Figure 6:
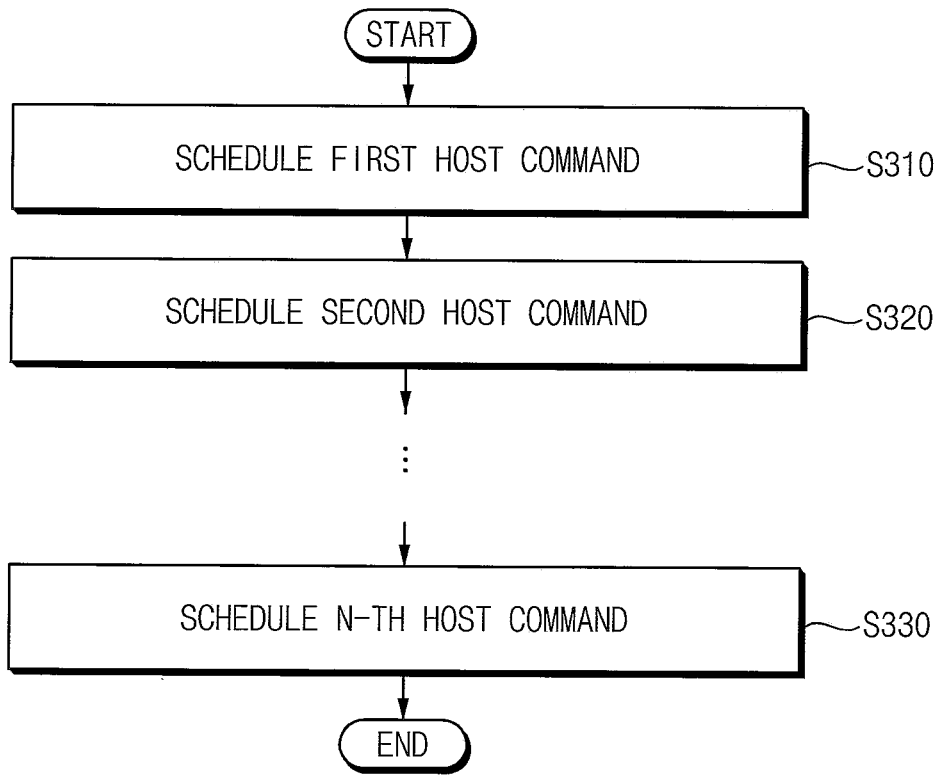
FIG. 6 is a flowchart illustrating an example of performing a first scheduling in FIG. 1.

FIG. 6 is a flowchart illustrating an example of performing a first scheduling in FIG. 1.

FIG. 6 illustrates an example where the first scheduling is performed on (or with respect to) the plurality of host commands sequentially. For example, the plurality of host commands may include first to N-th host commands that are sequentially received and queued, where N is a natural number greater than or equal to two.

Referring to FIGS. 1 and 6, when performing the first scheduling associated with the plurality of host commands (step S300), the first host command may be scheduled (step S310). After that, a second host command that is received after the first host command may be scheduled (step S320). After that, the N-th host command that is received later may be scheduled (step S330).

Figure 7:
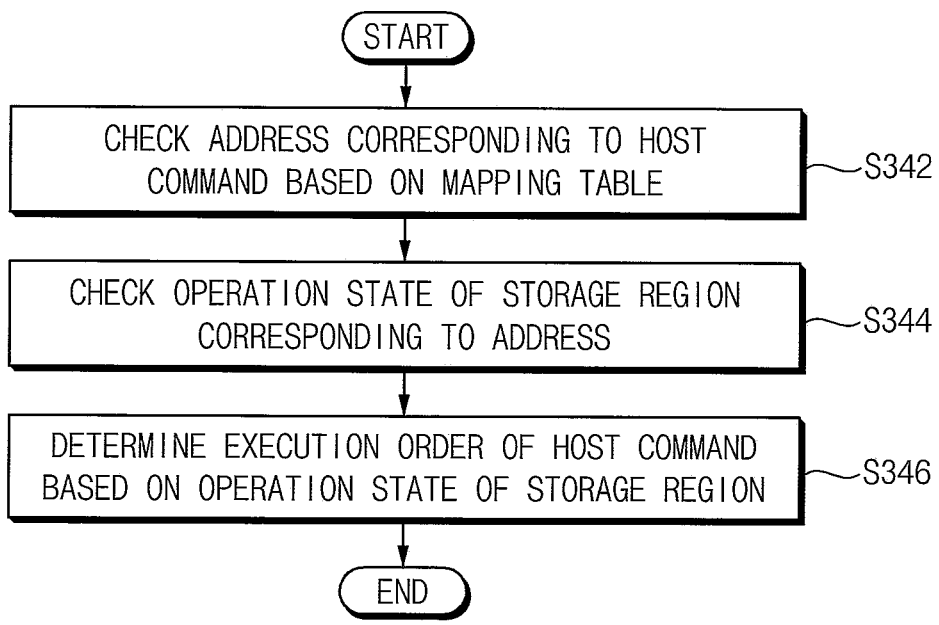
FIG. 7 is a flowchart illustrating an example of scheduling each host command in FIG. 6.

FIG. 7 is a flowchart illustrating an example of scheduling each host command in FIG. 6.

Referring to FIGS. 6 and 7, when scheduling each host command, each address corresponding to the host command may be checked or identified based on the mapping table (step S342). For example, in step S310, a first address corresponding to the first host command may be checked. In step S320, a second address corresponding to the second host command may be checked. In step S330, an N-th address corresponding to the N-th host command may be checked.

After that, an operation state of each storage region corresponding to each address may be checked (step S344). For example, in step S310, a first operation state of a storage region corresponding to the first address may be checked. In step S320, a second operation state of a storage region corresponding to the second address may be checked. In step S330, an N-th operation state of a storage region corresponding to the N-th address may be checked.

After that, an execution order of each host command may be determined based on the operation state of each storage region (step S346). For example, in step S310, an execution order of the first host command may be determined based on the first operation state. In step S320, an execution order of the second host command may be determined based on the second operation state. In step S330, an execution order of the N-th host command may be determined based on the N-th operation state.

Figure 8:
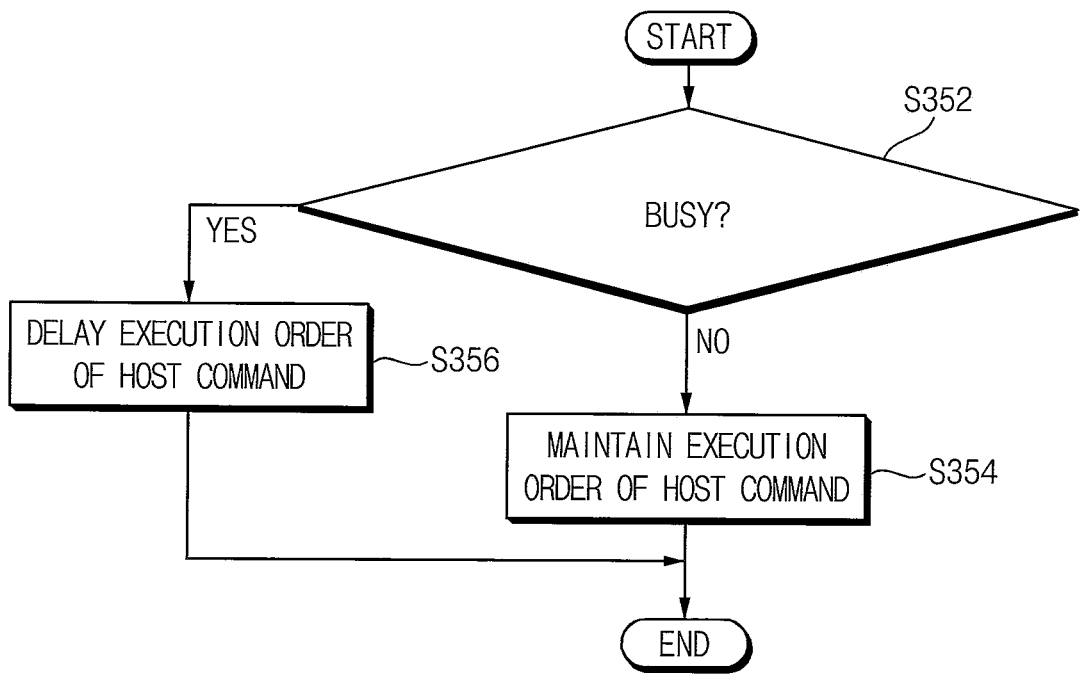
FIG. 8 is a flowchart illustrating an example of determining an execution order of each host command in FIG. 7.

FIG. 8 is a flowchart illustrating an example of determining an execution order of each host command in FIG. 7.

Referring to FIGS. 7 and 8, when determining the execution order of each host command, when the operation state of each storage region corresponds to an idle state rather than a busy state (step S352: NO), the execution order of each host command may be maintained (step S354). When the operation state of each storage region corresponds to the busy state (step S352: YES), the execution order of each host command may be delayed (step S356).

An operation of maintaining the execution order of each host command may mean that each host command is executed in the same order as a reception order or prior to the reception order. For example, when the execution order of each host command is maintained, each host command may be executed immediately after the host command is scheduled. An operation of delaying the execution order of each host command may mean that the host command is executed later than the reception order. For example, when the execution order of each host command is delayed, each host command may be executed after another host command is scheduled and executed.

For example, in step S310, the execution order of the first host command may be maintained when the first operation state corresponds to the idle state and the execution order of the first host command may be delayed when the first operation state corresponds to the busy state. In step S320, the execution order of the second host command may be maintained when the second operation state corresponds to the idle state and the execution order of the second host command may be delayed when the second operation state corresponds to the busy state. In step S330, the execution order of the N-th host command may be maintained when the N-th operation state corresponds to the idle state and the execution order of the N-th host command may be delayed when the N-th operation state corresponds to the busy state.

In some example embodiments, as the results of scheduling the first and second host commands that are sequentially received, when the first operation state corresponds to the busy state and the second operation state corresponds to the idle state, the second host command may be executed first and then the first host command may be executed later. In other words, the first host command may be executed later than the reception order and the second host command may be executed prior to the reception order.

Figure 9:
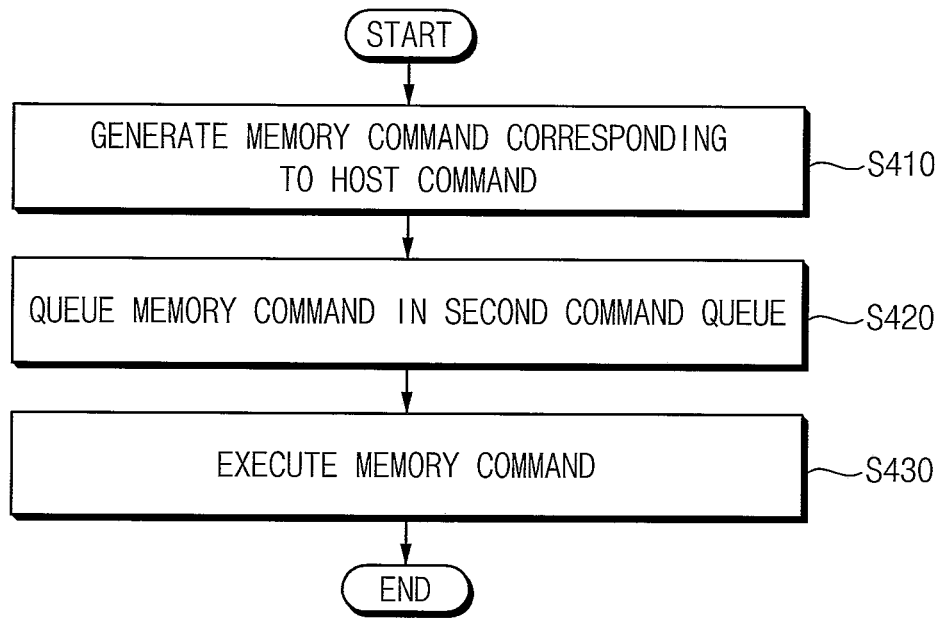
FIG. 9 is a flowchart illustrating an example of executing a plurality of host commands in FIG. 1.

FIG. 9 is a flowchart illustrating an example of executing a plurality of host commands in FIG. 1.

Referring to FIGS. 1 and 9, when executing the plurality of host commands based on the result of the first scheduling (step S400), a plurality of memory commands corresponding to the plurality of host commands may be generated (step S410). The plurality of memory commands may be queued in a second command queue (step S420). The plurality of memory commands may be executed (step S430).

In some example embodiments, when the first scheduling is sequentially performed on the plurality of host commands as described with reference to FIG. 6, step S400 may also be sequentially performed on the plurality of host commands.

For example, when step S310 in FIG. 6 is performed and when the first operation state corresponds to the idle state, a first memory command corresponding to the first host command may be generated, the first memory command may be queued in the second command queue, and the first memory command may be executed. After that, when step S320 in FIG. 6 is performed and when the second operation state corresponds to the idle state, a second memory command corresponding to the second host command may be generated, the second memory command may be queued in the second command queue, and the second memory command may be executed. For another example, when the first operation state corresponds to the busy state and when the second operation state corresponds to the idle state, the second memory command may be executed first and then the first memory command may be executed later.

FIGS. 10, 11, 12A, 12B, 12C, 12D, 12E, 12F, 12G and 12H are diagrams for describing operations of FIGS. 6, 7, 8 and 9.

Figure 10:
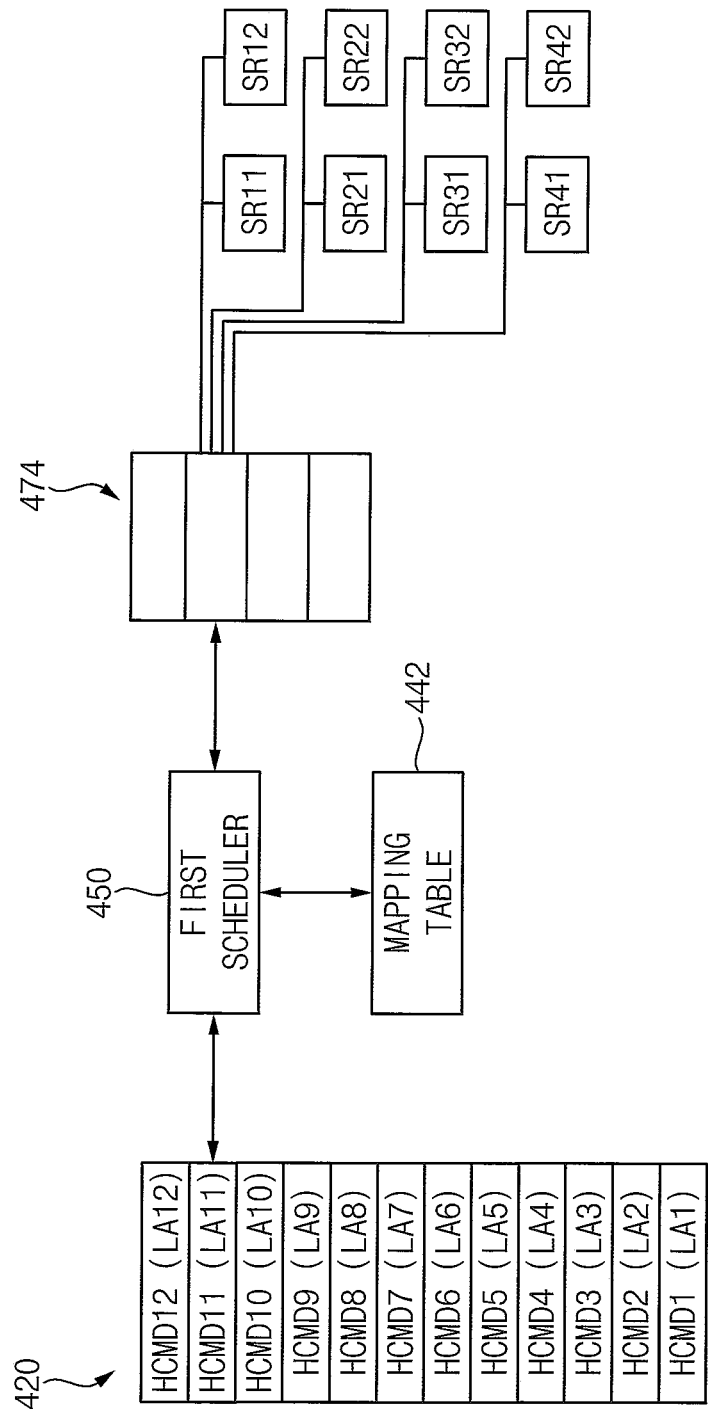

Referring to FIG. 10, an example of the first command queue 420 and the second command queue 474 that are included in the memory controller 400 of FIG. 4 is illustrated. For convenience of illustration, only components related to the operations of FIGS. 6, 7, 8 and 9 are illustrated.

The first command queue 420 may include a plurality of queue regions. A first host command HCMD1, a second host command HCMD2, a third host command HCMD3, a fourth host command HCMD4, a fifth host command HCMD5, a sixth host command HCMD6, a seventh host command HCMD7, an eighth host command HCMD8, a ninth host command HCMD9, a tenth host command HCMD10, an eleventh host command HCMD11 and a twelfth host command HCMD12 may be sequentially received and may be sequentially queued in the first command queue 420. The first to twelfth host commands HCMD1 to HCMD12 may include a first logical address LA1, a second logical address LA2, a third logical address LA3, a fourth logical address LA4, a fifth logical address LA5, a sixth logical address LA6, a seventh logical address LA7, an eighth logical address LA8, a ninth logical address LA9, a tenth logical address LA10, an eleventh logical address LA11 and a twelfth logical address LA12, respectively. For example, the first to twelfth host commands HCMD1 to HCMD12 may be read commands and the first to twelfth logical addresses LA1 to LA12 may be logical block addresses (LBAs).

The second command queue 474 may also include a plurality of queue regions. Memory commands generated based on the host commands HCMD1 to HCMD12 may be queued in the second command queue 474, and a plurality of storage regions SR11, SR12, SR21, SR22, SR31, SR32, SR41 and SR42 may be accessed based on the memory commands. For example, a data read operation may be performed on the plurality of storage regions SR11 to SR42. At an initial operation time, the second command queue 474 may be empty.

At least some of the plurality of storage regions SR11 to SR42 may share one channel. For example, the storage regions SR11 and SR12 may be commonly connected to a first channel, the storage regions SR21 and SR22 may be commonly connected to a second channel, the storage regions SR31 and SR32 may be commonly connected to a third channel, and the storage regions SR41 and SR42 may be commonly connected to a fourth channel. Storage regions connected to the same channel may not be simultaneously accessed.

In some example embodiments, the number of the queue regions included in the second command queue 474 may be substantially equal to the number of the channels. Although FIG. 10 illustrates four queue regions and four channels, example embodiments are not limited thereto.

The first scheduler 450 may perform the first scheduling based on the mapping table 442 and operation states of the plurality of storage regions SR11 to SR42. For example, the first scheduler 450 may check the operation states of the plurality of storage regions SR11 to SR42 based on the memory commands queued in the second command queue 474.

Referring to FIG. 11, an example of the mapping table 442 in FIG. 10 is illustrated.

The first to twelfth logical addresses LA1 to LA12 may correspond to a first physical address PA1, a second physical address PA2, a third physical address PA3, a fourth physical address PA4, a fifth physical address PA5, a sixth physical address PA6, a seventh physical address PA7, an eighth physical address PA8, a ninth physical address PA9, a tenth physical address PA10, an eleventh physical address PA11 and a twelfth physical address PA12, respectively. For example, the first to twelfth physical addresses PA1 to PA12 may be physical page numbers (PPNs). In addition, each of the first to twelfth physical addresses PA1 to PA12 may correspond to a respective one of the plurality of storage regions SR11 to SR42. For example, the first physical address PA1 may correspond to the storage region SR11.

The first scheduler 450 may check the physical addresses PA1 to PA12 and the storage regions SR11 to SR42 corresponding to the host commands HCMD1 to HCMD12 based on the mapping table 442.

Referring to FIGS. 12A, 12B, 12C, 12D, 12E, 12F, 12G and 12H, an example of the first scheduling performed by the first scheduler 450 is illustrated.

At an initial operation time, as described with reference to FIG. 10, the second command queue 474 may be empty, all storage regions SR11 to SR42 may not be accessed, and all channels may not be used.

Figure 12A:
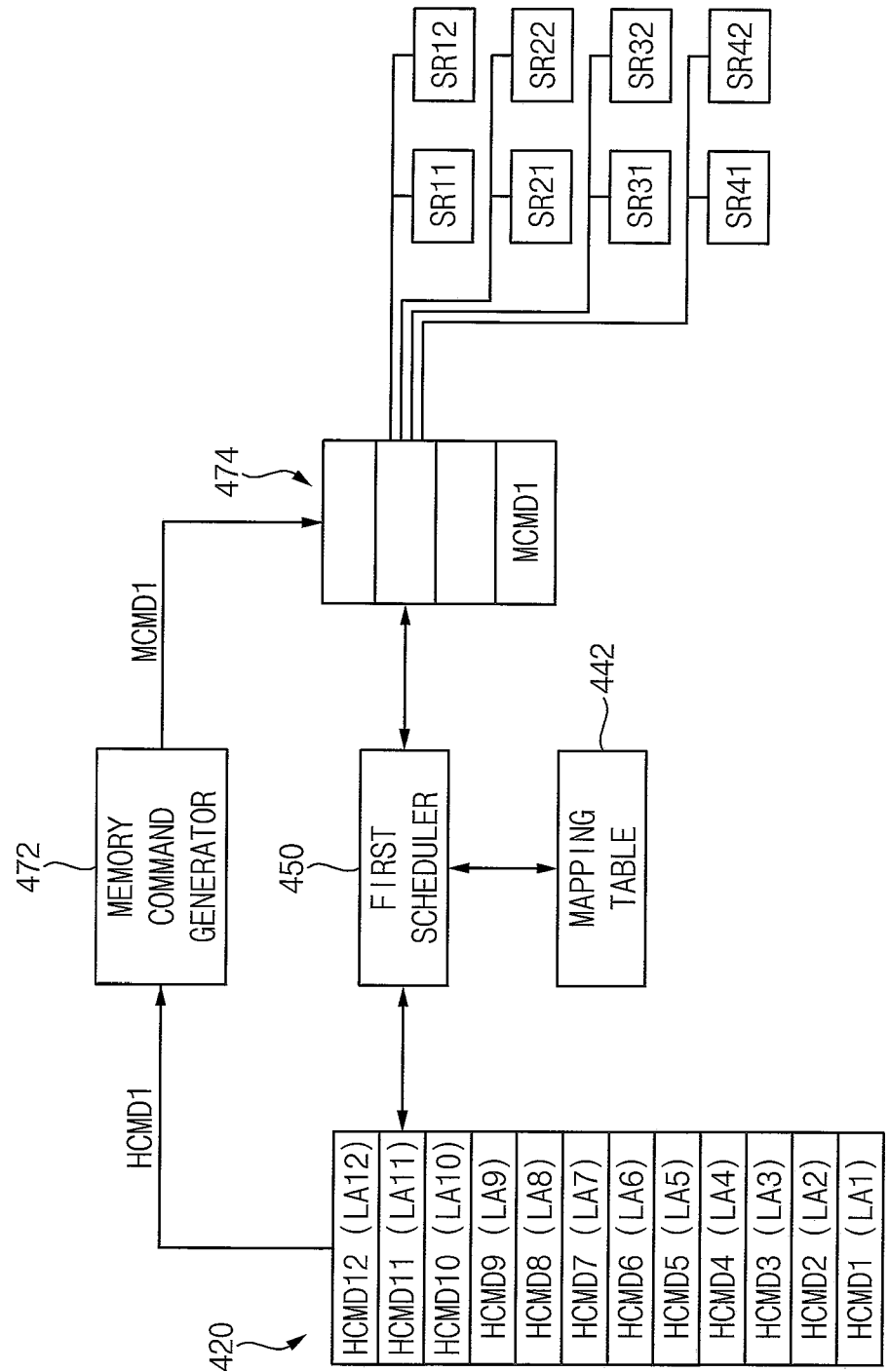

First, the first scheduler 450 may schedule the first host command HCMD1 that is received first. For example, the first scheduler 450 may check the first physical address PA1 corresponding to the first logical address LA1 of the first host command HCMD1 using the mapping table 442 and may check an operation state of the storage region SR11 corresponding to the first physical address PA1 using the second command queue 474. The storage region SR11 and the first channel connected thereto may not be accessed, and the storage region SR11 may have the idle state. Thus, the first scheduler 450 may maintain an execution order of the first host command HCMD, and the first host command HCMD1 may be immediately executed. For example, as illustrated in FIG. 12A, the memory command generator 472 may generate a first memory command MCMD1 corresponding to the first host command HCMD1 and may queue the first memory command MCMD1 in the second command queue 474. After that, the storage region SR11 may be accessed by executing the first memory command MCMD1 (e.g., by transmitting the first memory command MCMD1 to the memory device).

Figure 12B:
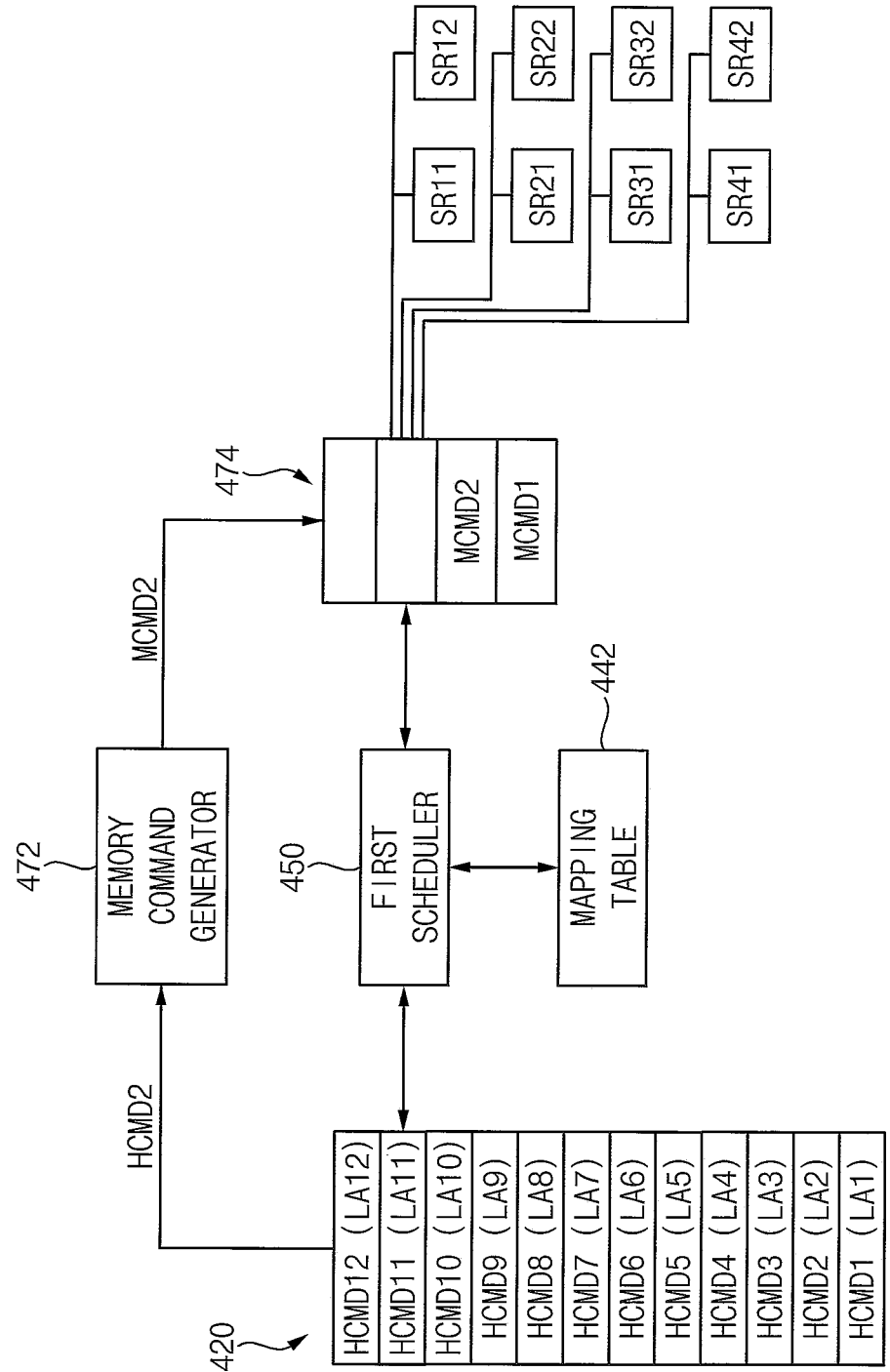

Next, the first scheduler 450 may schedule the second host command HCMD2 that is received after the first host command HCMD1. For example, an operation state of the storage region SR21 and the second channel connected thereto, which correspond to the second host command HCMD2, may be checked using the mapping table 442 and the second command queue 474. Since the storage region SR21 has the idle state, an execution order of the second host command HCMD2 may be maintained and the second host command HCMD2 may be immediately executed. For example, as illustrated in FIG. 12B, a second memory command MCMD2 corresponding to the second host command HCMD2 may be generated, the second memory command MCMD2 may be queued in the second command queue 474, and the storage region SR21 may be accessed by executing the second memory command MCMD2.

Next, the first scheduler 450 may schedule the third host command HCMD3 that is received after the second host command HCMD2. For example, the storage region SR11 corresponding to the third host command HCMD3 may be accessed by the first memory command MCMD1 and may have the busy state. Thus, the first scheduler 450 may delay an execution order of the third host command HCMD3. For example, an execution of the third host command HCMD3 may be delayed until the execution of the first memory command MCMD1 is completed.

Figure 12C:
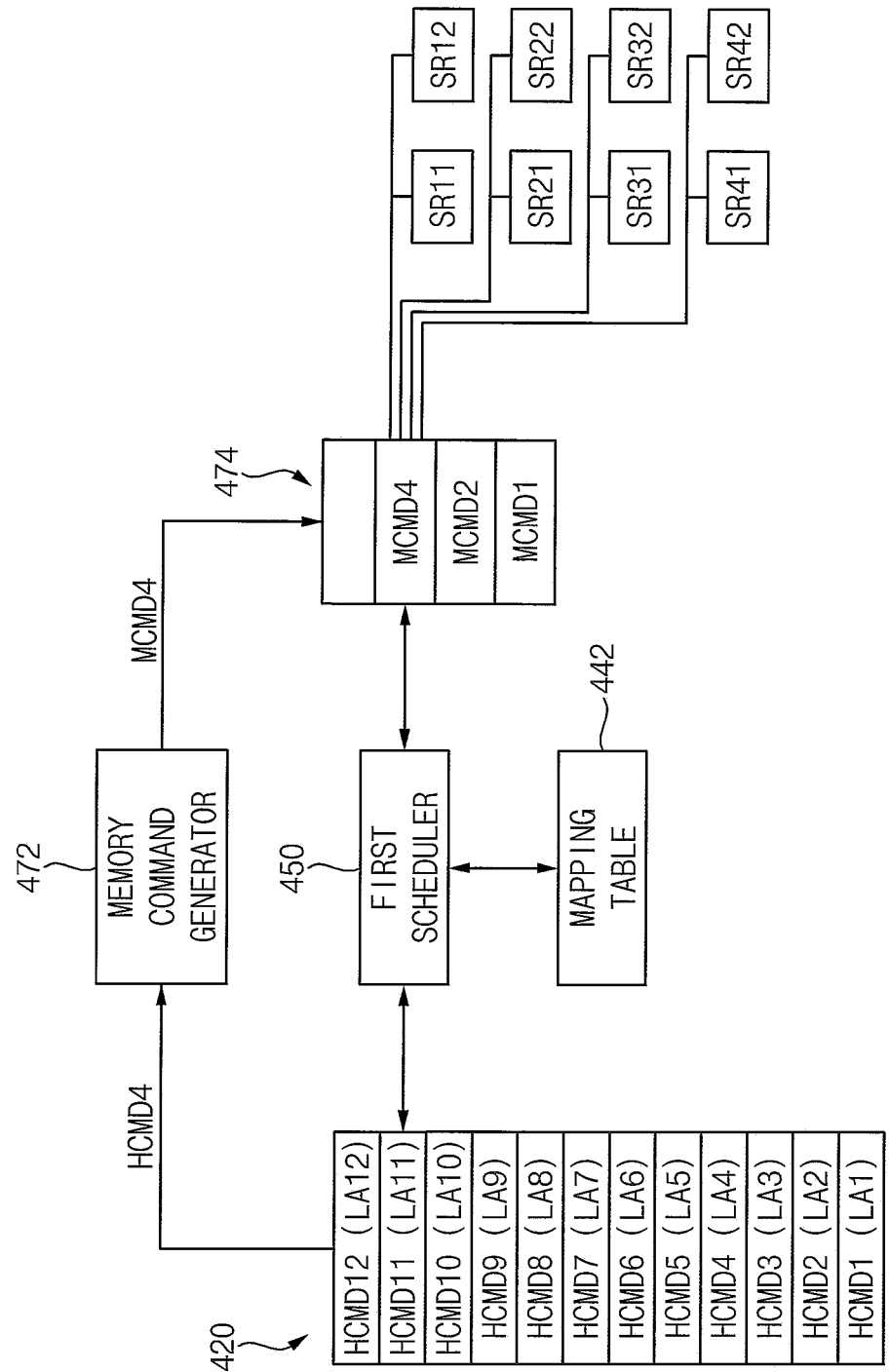

Next, the first scheduler 450 may schedule the fourth host command HCMD4 that is received after the third host command HCMD3. For example, since the storage region SR31 corresponding to the fourth host command HCMD4 has the idle state, an execution order of the fourth host command HCMD4 may be maintained and the fourth host command HCMD4 may be immediately executed. For example, as illustrated in FIG. 12C, a fourth memory command MCMD4 corresponding to the fourth host command HCMD4 may be generated, the fourth memory command MCMD4 may be queued in the second command queue 474, and the storage region SR31 may be accessed by executing the fourth memory command MCMD4.

Next, the first scheduler 450 may schedule the fifth host command HCMD5 that is received after the fourth host command HCMD4. For example, even though the storage region SR12 corresponding to the fifth host command HCMD5 is not accessed, the storage region SR11 among the storage regions SR11 and SR12 sharing the first channel may be accessed by the first memory command MCMD1. Thus, the storage region SR12 may have the busy state and an execution order of the fifth host command HCMD5 may be delayed.

Next, the first scheduler 450 may schedule the sixth host command HCMD6 that is received after the fifth host command HCMD5. For example, the storage region SR21 corresponding to the sixth host command HCMD6 may be accessed by the second memory command MCMD2 and may have the busy state. Thus, an execution order of the sixth host command HCMD6 may be delayed.

Figure 12D:
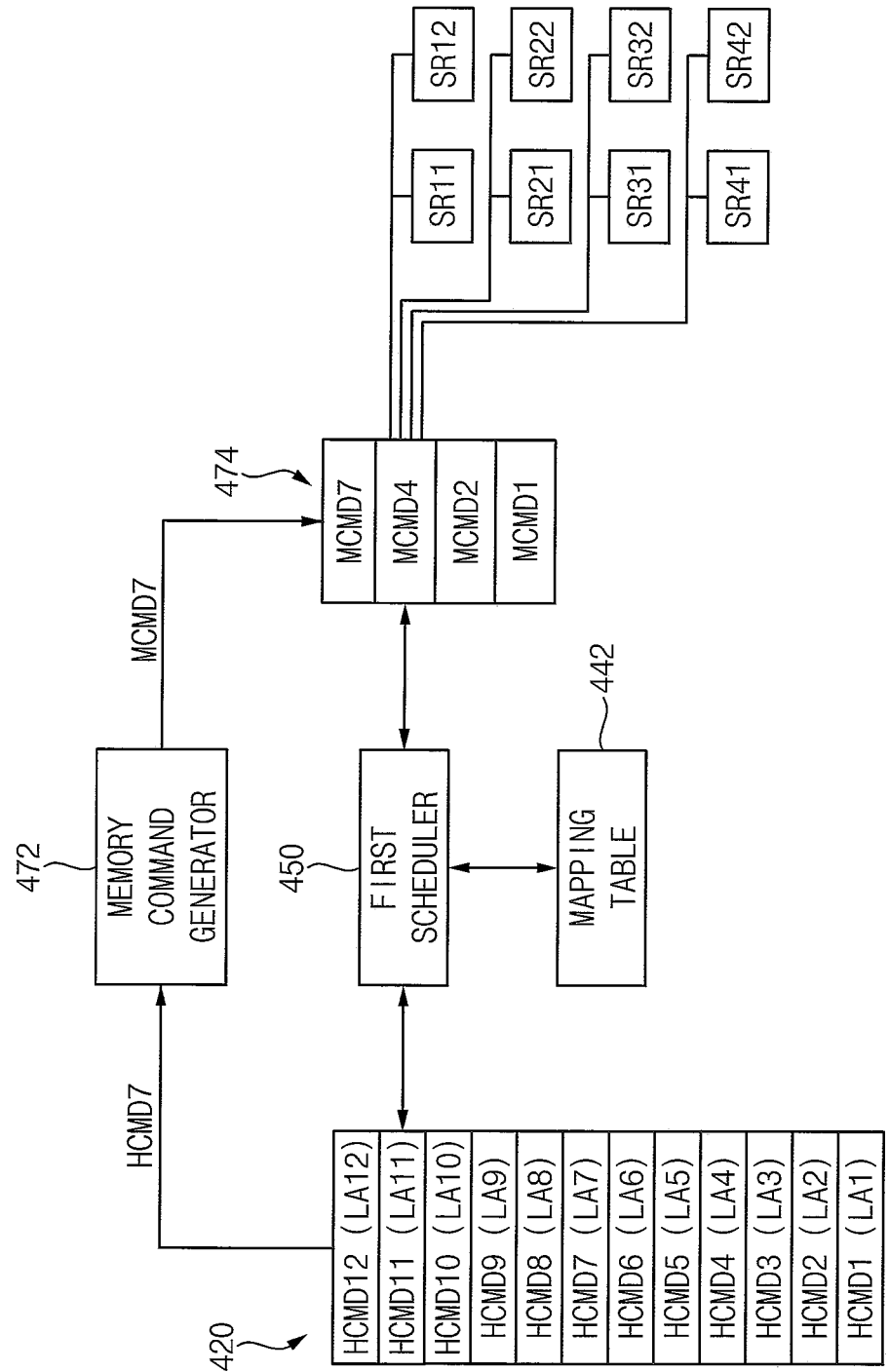

Next, the first scheduler 450 may schedule the seventh host command HCMD7 that is received after the sixth host command HCMD6. For example, since the storage region SR41 corresponding to the seventh host command HCMD7 has the idle state, an execution order of the seventh host command HCMD7 may be moved forward and the seventh host command HCMD7 may be immediately executed. For example, as illustrated in FIG. 12D, a seventh memory command MCMD7 corresponding to the seventh host command HCMD7 may be generated, the seventh memory command MCMD7 may be queued in the second command queue 474, and the storage area SR41 may be accessed by executing the seventh memory command MCMD7.

Since the second command queue 474 is full, the memory commands MCMD1, MCMD2, MCMD4 and MCMD7 that are currently being executed must be completed before the subsequent host commands HCMD8 to HCMD12 are scheduled.

Figure 12E:
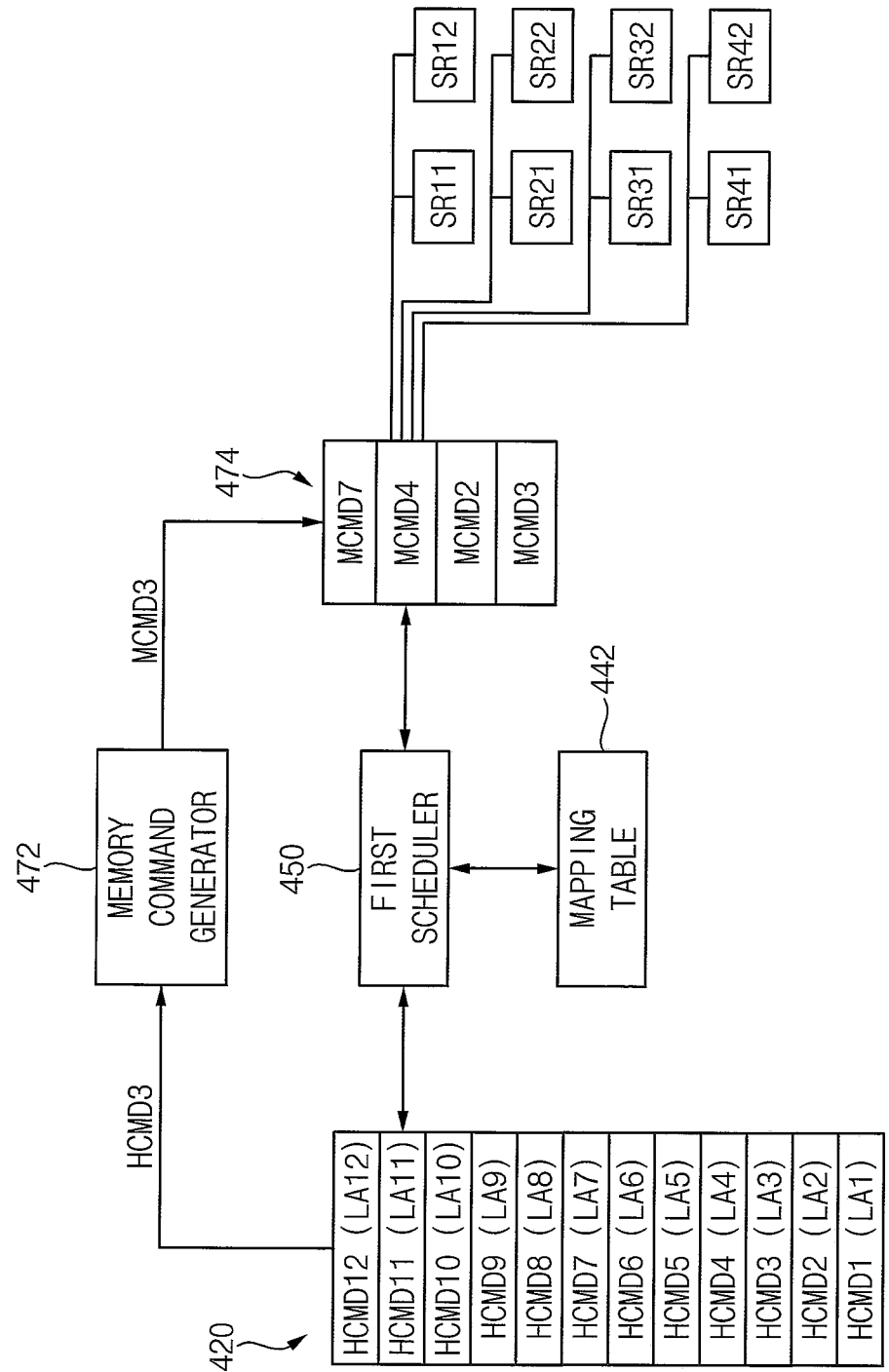

The execution of the first memory command MCMD1 that has started to be executed first may be completed first. When the execution of the first memory command MCMD1 is completed, it may be checked first whether a host command corresponding to the first channel and the storage regions SR11 and SR12 exists among host commands whose execution order is delayed. When the host command corresponding to the first channel and the storage regions SR11 and SR12 exists among the host commands whose execution order is delayed, the corresponding host command may be executed. When the host command corresponding to the first channel and the storage regions SR11 and SR12 does not exist among the host commands whose execution order is delayed, a subsequent scheduling may be performed and a host command corresponding to the first channel and the storage regions SR11 and SR12 may be executed earlier based on a result of the subsequent scheduling. For example, since the execution order of the third and fifth host commands HCMD3 and HCMD5 corresponding to the storage regions SR11 and SR12 are delayed and since the third host command HCMD3 is received prior to the fifth host command HCMD5, the third host command HCMD3 may be executed before the subsequent scheduling. For example, as illustrated in FIG. 12E, a third memory command MCMD3 corresponding to the third host command HCMD3 may be generated, the third memory command MCMD3 may be queued in the second command queue 474, and the storage region SR11 may be accessed by executing the third memory command MCMD3.

Figure 12F:
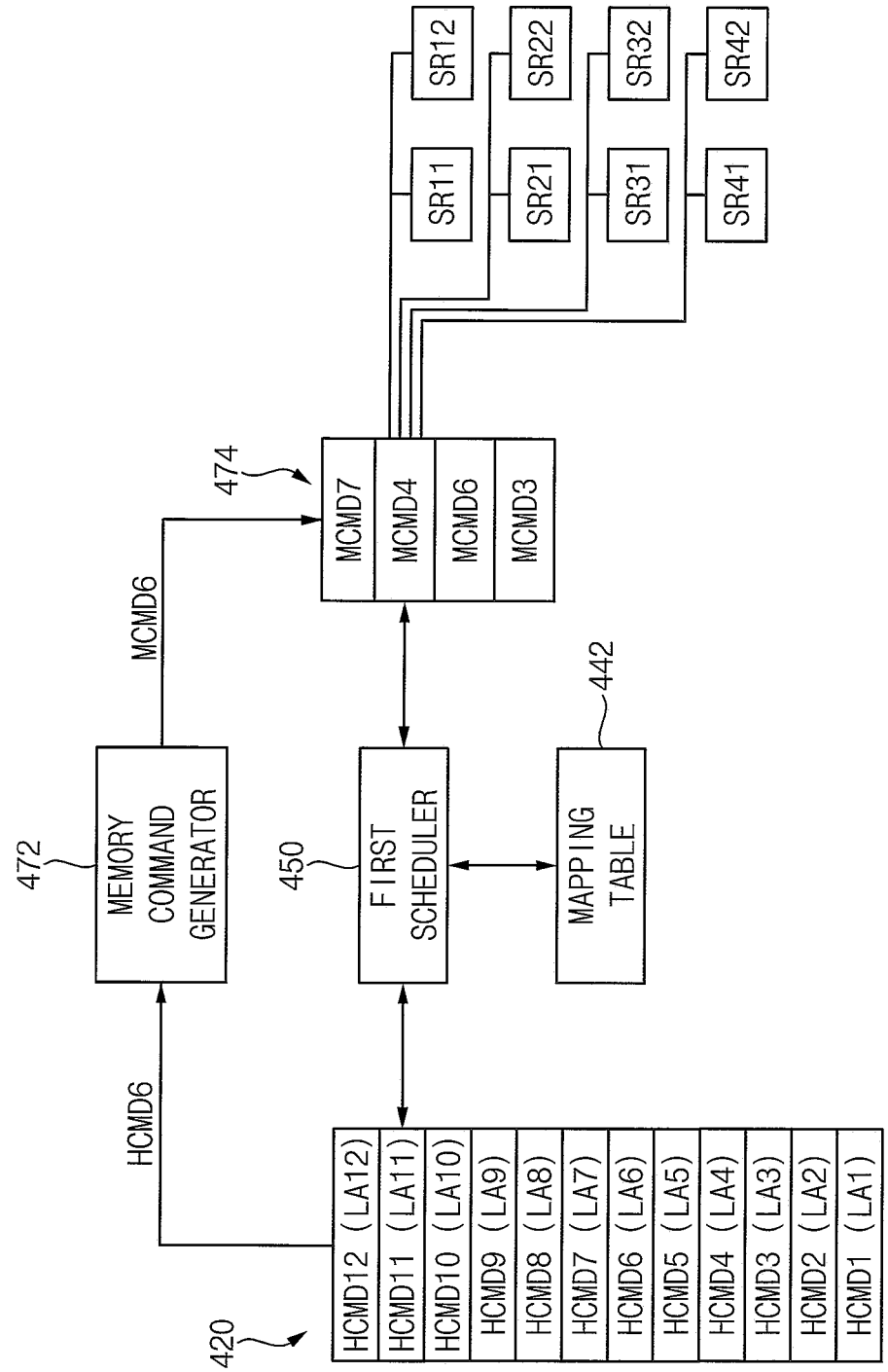

Next, the execution of the second memory command MCMD2 may be completed. For example, since the execution order of the sixth host command HCMD6 corresponding to the storage region SR21 is delayed, the sixth host command HCMD6 may be executed. For example, as illustrated in FIG. 12F, a sixth memory command MCMD6 corresponding to the sixth host command HCMD6 may be generated, the sixth memory command MCMD6 may be queued in the second command queue 474, and the storage region SR21 may be accessed by executing the sixth memory command MCMD6.

Next, the execution of the fourth memory command MCMD4 may be completed. For example, since a host command corresponding to the third channel and the storage regions SR31 and SR32 does not exist among the host commands whose execution order is delayed, the subsequent scheduling may be performed.

The first scheduler 450 may schedule the eighth host command HCMD8 that is received after the seventh host command HCMD7. For example, even though the storage region SR22 corresponding to the eighth host command HCMD8 is not accessed, the storage region SR21 among the storage regions SR21 and SR22 sharing the second channel may be accessed by the sixth memory command MCMD6. Thus, the storage region SR22 may have the busy state and an execution order of the eighth host command HCMD8 may be delayed.

Figure 12G:
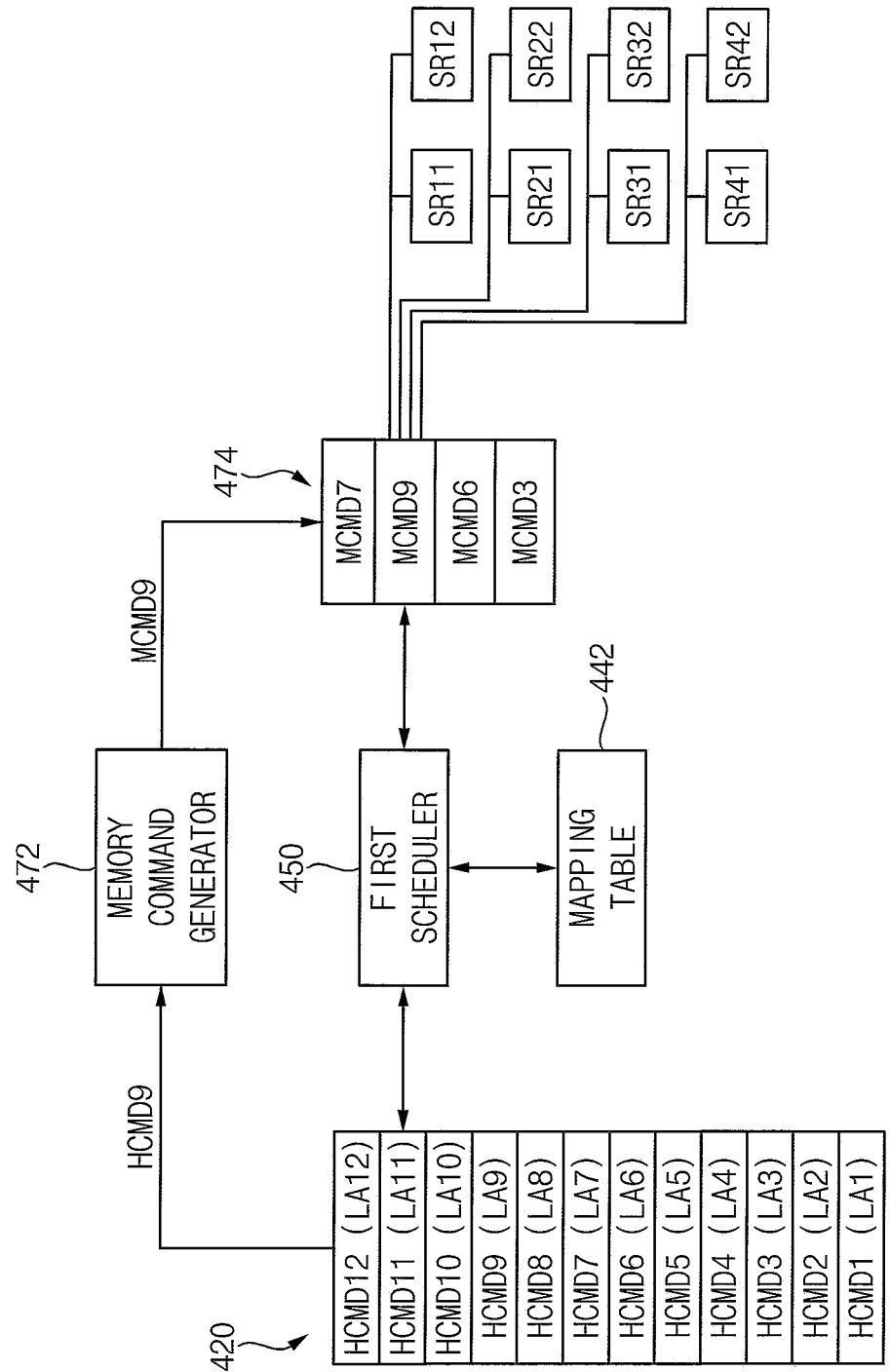

Next, the first scheduler 450 may schedule the ninth host command HCMD9 that is received after the eighth host command HCMD8. For example, since the storage region SR31 corresponding to the ninth host command HCMD9 has the idle state, an execution order of the ninth host command HCMD9 may be moved forward and the ninth host command HCMD9 may be immediately executed. For example, as illustrated in FIG. 12G, a ninth memory command MCMD9 corresponding to the ninth host command HCMD9 may be generated, the ninth memory command MCMD9 may be queued in the second command queue 474, and the storage region SR31 may be accessed by executing the ninth memory command MCMD9.

Next, the execution of the seventh memory command MCMD7 may be completed. For example, since a host command corresponding to the fourth channel and the storage regions SR41 and SR42 does not exist among the host commands whose execution order is delayed, the subsequent scheduling may be performed.

Figure 12H:
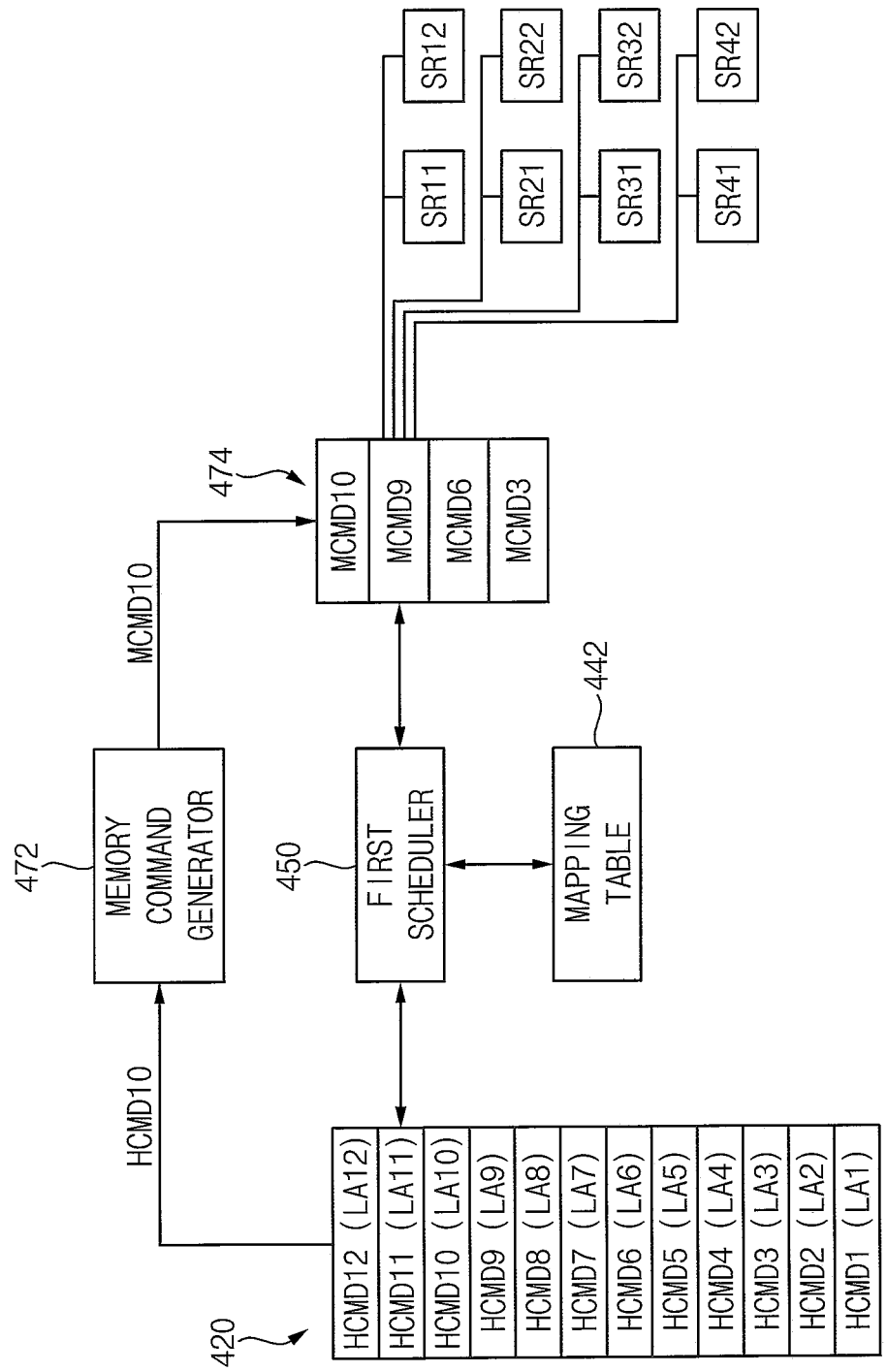

The first scheduler 450 may schedule the tenth host command HCMD10 that is received after the ninth host command HCMD9. For example, since the storage region SR42 corresponding to the tenth host command HCMD10 has the idle state, an execution order of the tenth host command HCMD10 may be moved forward and the tenth host command HCMD10 may be immediately executed. For example, as illustrated in FIG. 12H, a tenth memory command MCMD10 corresponding to the tenth host command HCMD10 may be generated, the tenth memory command MCMD10 may be queued in the second command queue 474, and the storage region SR42 may be accessed by executing the tenth memory command MCMD10.

Although not illustrated in detail, the execution of the third, sixth, ninth and tenth memory commands MCMD3, MCMD6, MCMD9 and MCMD10 may be sequentially completed similar to the description above. After that, the fifth and eighth host commands HCMD5 and HCMD8 whose execution order is delayed may be sequentially executed, the eleventh and twelfth host commands HCMD11 and HCMD12 may be sequentially scheduled, and the twelfth and eleventh host commands HCMD12 and HCMD11 may be sequentially executed. As a result, fifth, eighth, twelfth and eleventh memory commands MCMD5, MCMD8, MCMD12 and MCMD11 that correspond to the fifth, eighth, twelfth and eleventh host commands HCMD5, HCMD8, HCMD12 and HCMD11, respectively, may be sequentially generated, queued, and executed.

Although example embodiments are described that one memory command is generated based on one host command, example embodiments are not limited thereto. For example, a plurality of memory commands may be generated based on one host command.

Figure 13:
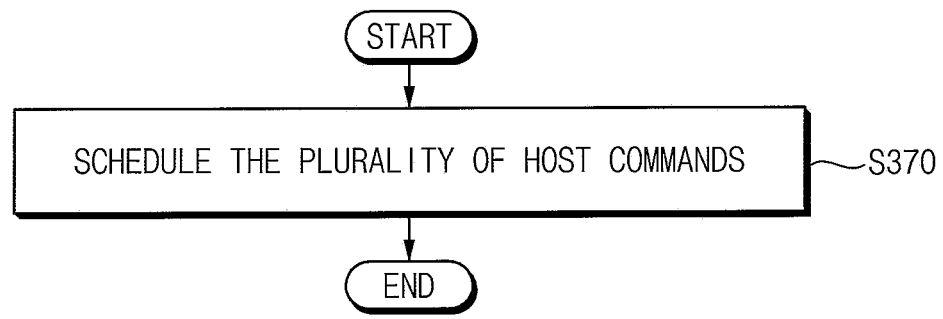
FIG. 13 is a flowchart illustrating another example of performing a first scheduling in FIG. 1.

FIG. 13 is a flowchart illustrating another example of performing a first scheduling in FIG. 1. The descriptions repeated with FIG. 6 will be omitted.

FIG. 13 illustrates an example where the first scheduling is performed on the plurality of host commands at one time (or at once) or substantially simultaneously.

Referring to FIGS. 1 and 13, when performing the first scheduling associated with the plurality of host commands (step S300), the plurality of host commands (e.g., the first to N-th host commands) may be scheduled at one time or substantially simultaneously (step S370).

Figure 14:
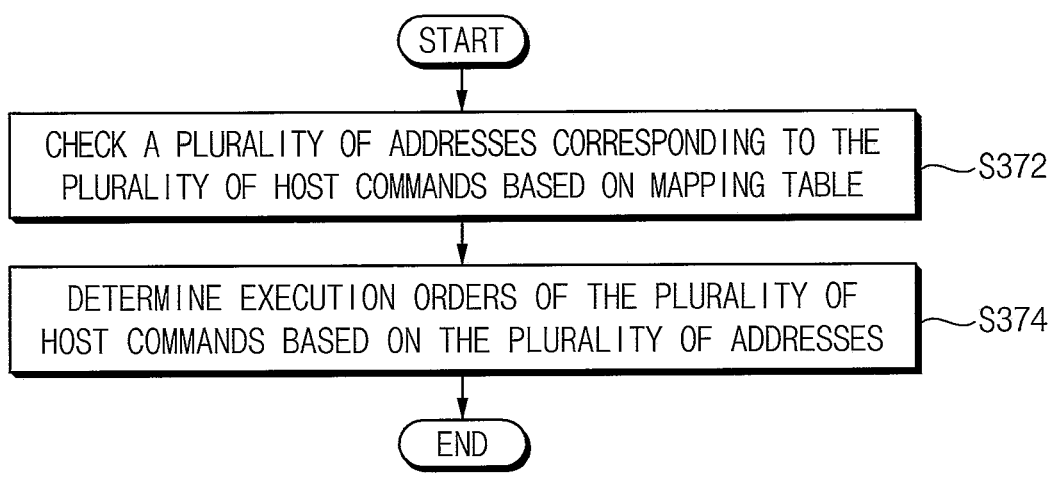
FIG. 14 is a flowchart illustrating an example of scheduling a plurality of host commands in FIG. 13.

FIG. 14 is a flowchart illustrating an example of scheduling a plurality of host commands in FIG. 13. The descriptions repeated with FIG. 7 will be omitted.

Referring to FIGS. 13 and 14, when scheduling the plurality of host commands (step S370), a plurality of addresses corresponding to the plurality of host commands may be checked based on the mapping table (step S372). For example, the first to N-th addresses corresponding to the first to N-th host commands may be checked.

After that, execution order of the plurality of host commands may be determined based on the plurality of addresses (step S374). For example, when the number of host commands allowed to be executed at one time is X, where X is a natural number greater than or equal to two, the execution order of the plurality of host commands may be determined such that X adjacent host commands correspond to different storage regions.

After that, step S400 in FIG. 1 may be performed similarly to that described with reference to FIG. 9, except that at least some of the plurality of host commands may be executed at one time or substantially simultaneously.

Figure 15A:
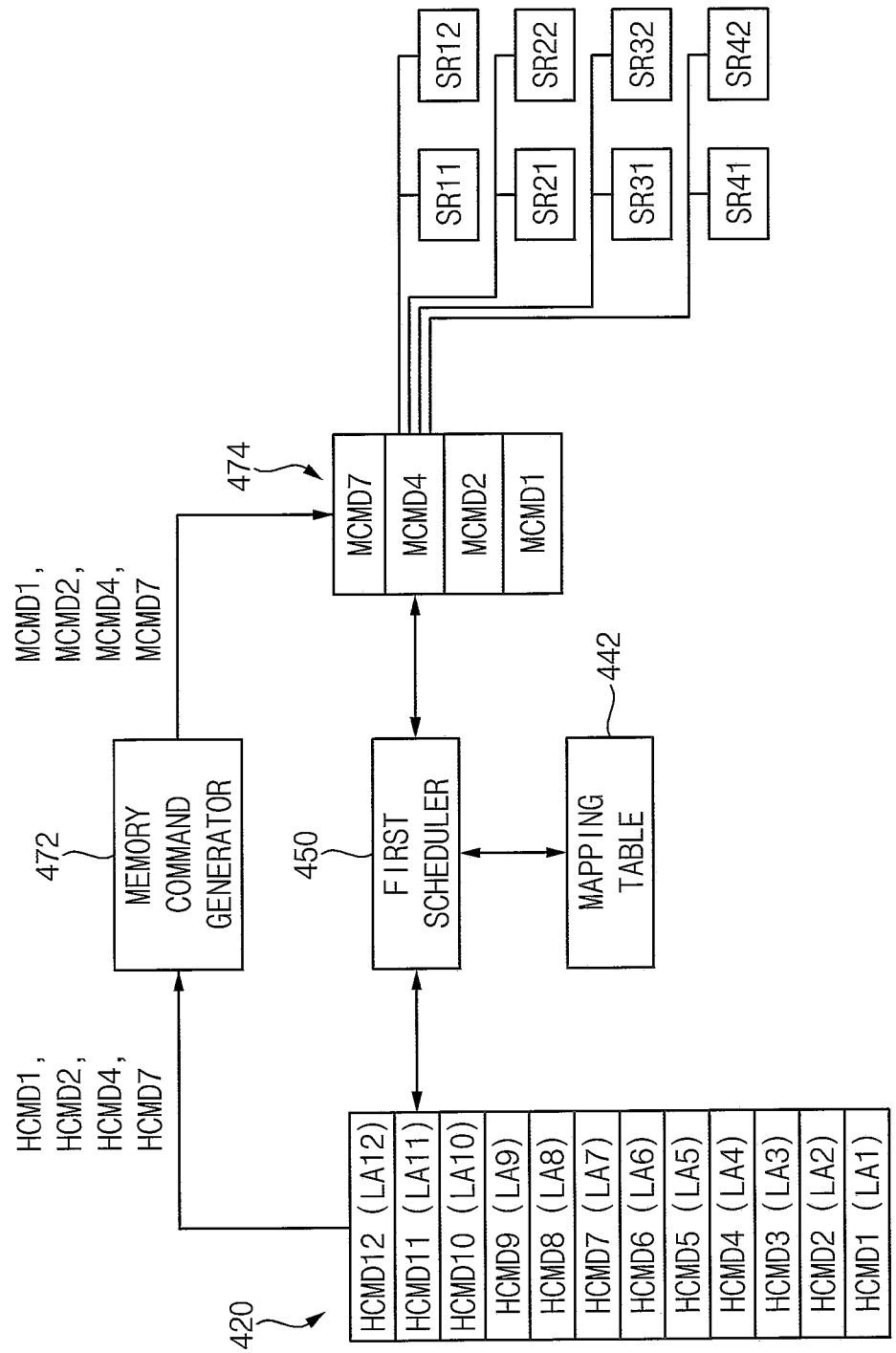
FIGS. 15A, 15B and 15C are diagrams for describing operations of FIGS. 13 and 14.
Figure 15B:
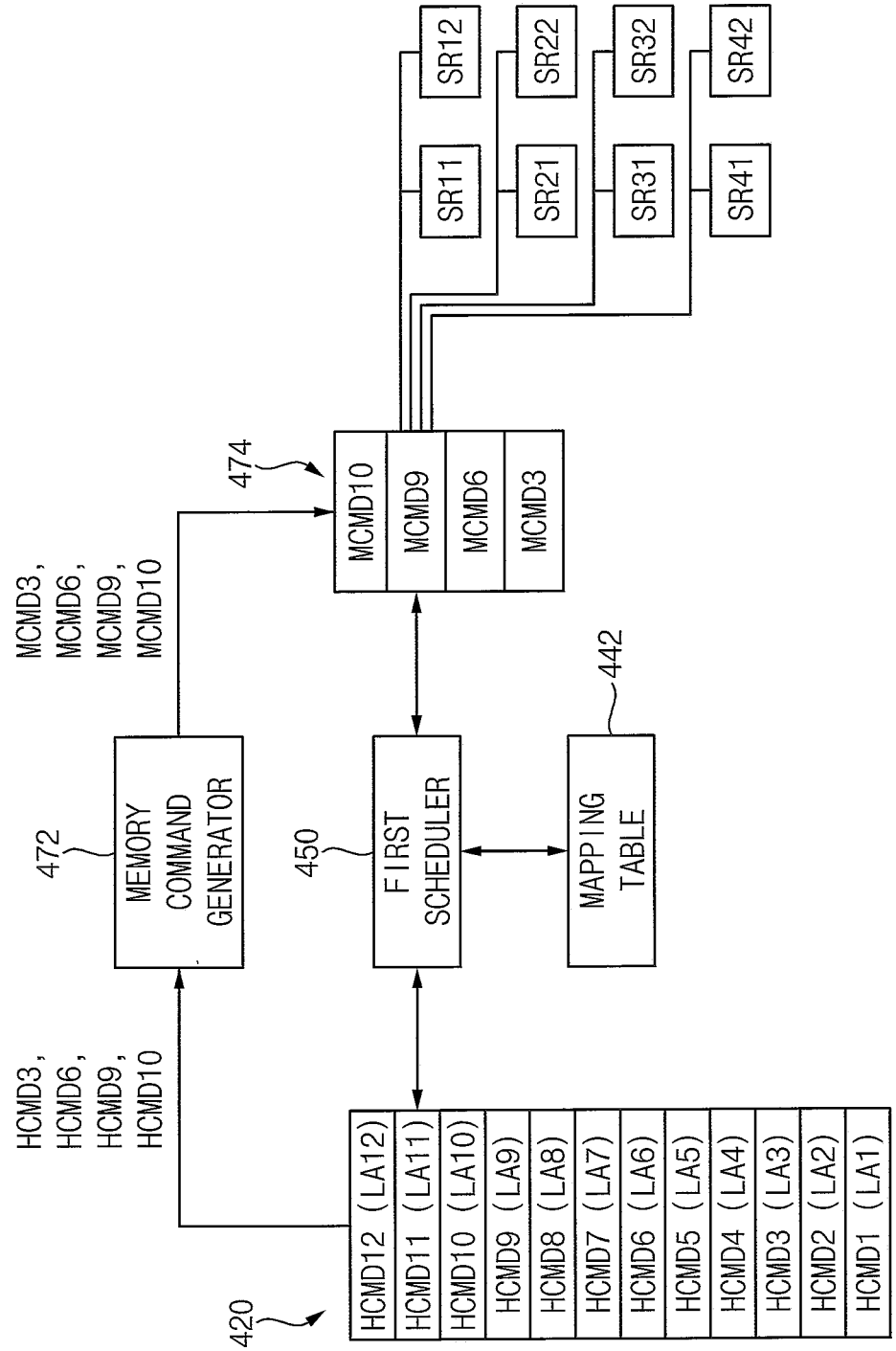
Figure 15C:
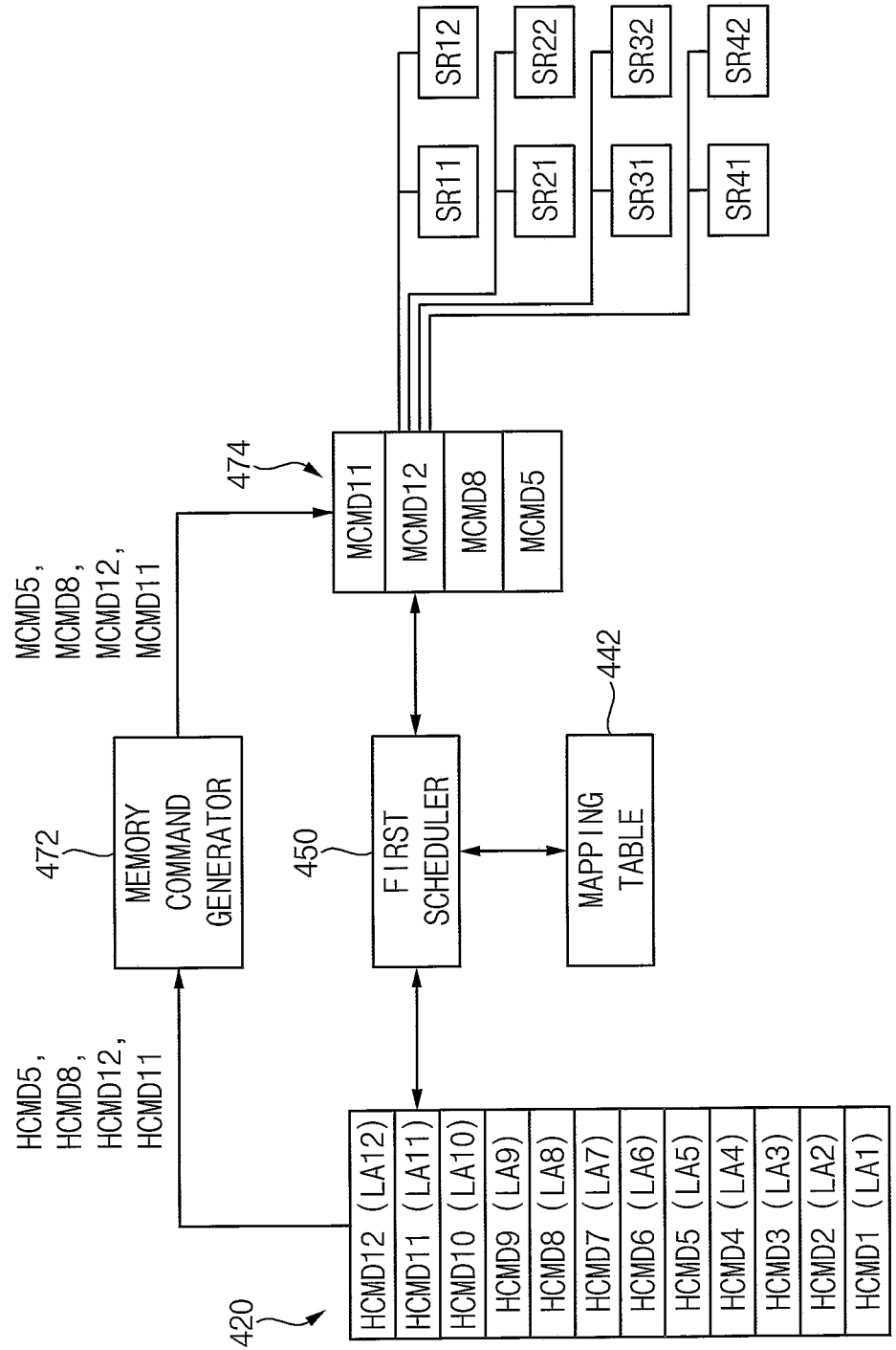

FIGS. 15A, 15B and 15C are diagrams for describing operations of FIGS. 13 and 14. The descriptions repeated with FIGS. 10, 11, 12A, 12B, 12C, 12D, 12E, 12F, 12G and 12H will be omitted.

Referring to FIGS. 15A, 15B and 15C, another example of the first scheduling performed by the first scheduler 450 is illustrated. For example, the number of host commands allowed to be executed at one time may be four (e.g., X=4).

First, the first scheduler 450 may schedule the first to twelfth host commands HCMD1 to HCMD12 at one time or substantially simultaneously. For example, the first, third and fifth host commands HCMD1, HCMD3 and HCMD5 corresponding to the storage regions SR11 and SR12 may be sequentially allocated or assigned to a first host command group, a second host command group and a third host command group, respectively. Similarly, the second, sixth and eighth host commands HCMD2, HCMD6 and HCMD8 corresponding to the storage regions SR21 and SR22 may be sequentially allocated to the first, second and third host command groups, respectively. The fourth, ninth and twelfth host commands HCMD4, HCMD9 and HCMD12 corresponding to the storage region SR31 may be sequentially allocated to the first, second and third host command groups, respectively. The seventh, tenth and eleventh host commands HCMD7, HCMD10 and HCMD11 corresponding to the storage regions SR41 and SR42 may be sequentially allocated to the first, second and third host command groups, respectively.

As a result of the first scheduling, the adjacent host commands HCMD1, HCMD2, HCMD4 and HCMD7 in the first host command group may correspond to different channels and different storage regions SR11, SR21, SR31 and SR41. Similarly, the adjacent host commands HCMD3, HCMD6, HCMD9 and HCMD10 in the second host command group may correspond to different channels and different storage regions SR11, SR21, SR31 and SR42. The adjacent host commands HCMD5, HCMD8, HCMD12 and HCMD11 in the third host command group may correspond to different channels and different storage regions SR12, SR22, SR31 and SR41.

After that, the first, second and third host command groups may be sequentially executed. For example, as illustrated in FIG. 15A, the memory commands MCMD1, MCMD2, MCMD4 and MCMD7 corresponding to the host commands HCMD1, HCMD2, HCMD4 and HCMD7 may be generated, queued, and executed. After that, as illustrated in FIG. 15B, the memory commands MCMD3, MCMD6, MCMD9 and MCMD10 corresponding to the host commands HCMD3, HCMD6, HCMD9 and HCMD10 may be generated, queued, and executed. After that, as illustrated in FIG. 15C, the memory commands MCMD5, MCMD8, MCMD12 and MCMD11 corresponding to the host commands HCMD5, HCMD8, HCMD12 and HCMD11 may be generated, queued, and executed.

Figure 16:
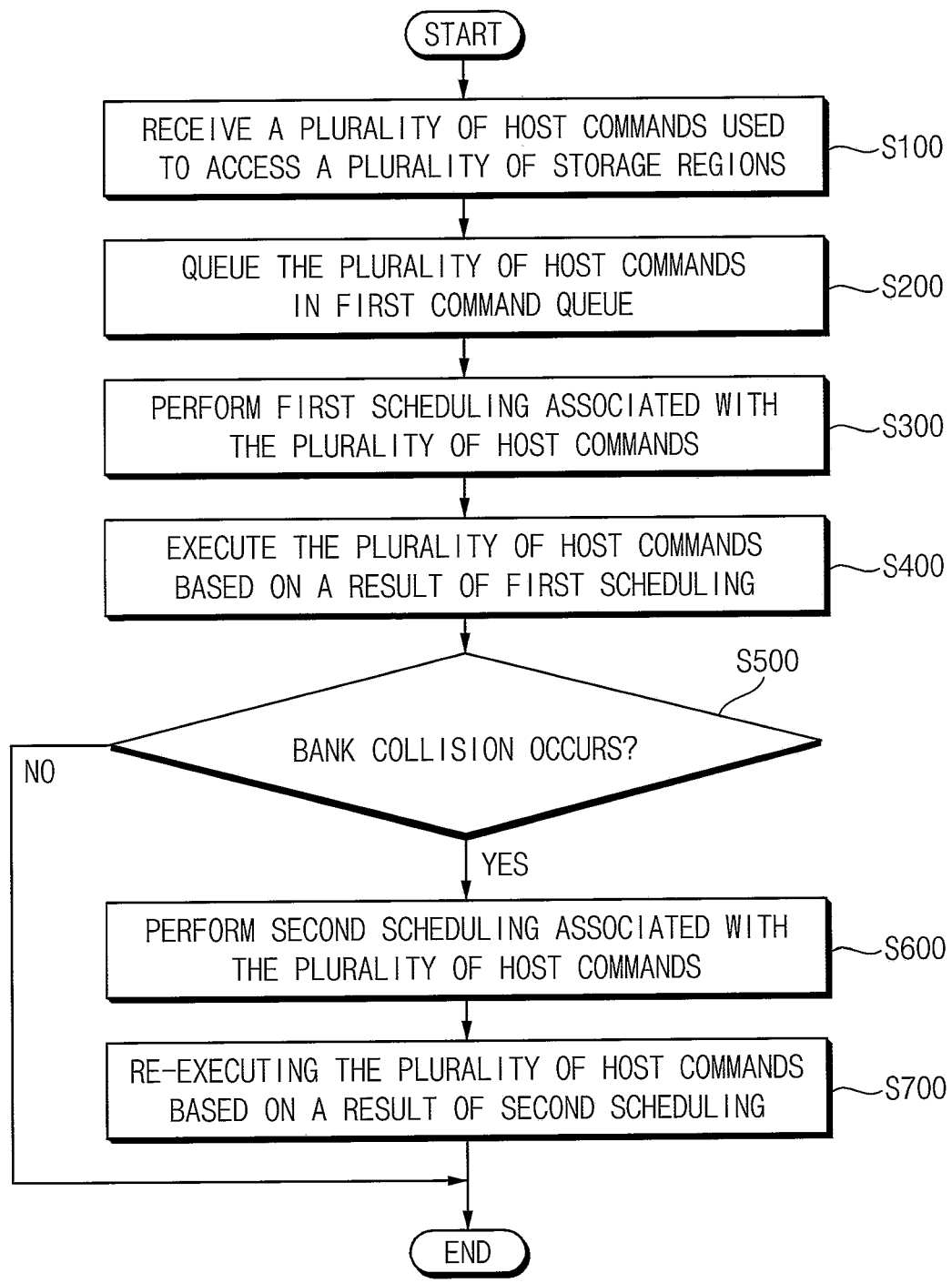
FIG. 16 is a flowchart illustrating a method of scheduling commands according to example embodiments.

FIG. 16 is a flowchart illustrating a method of scheduling commands according to example embodiments. The descriptions repeated with FIG. 1 will be omitted.

Referring to FIG. 16, in a method of scheduling commands according to example embodiments, steps S100, S200, S300 and S400 may be substantially the same as steps S100, S200, S300 and S400 in FIG. 1, respectively.

When a bank collision occurs while the plurality of host commands are executed (step S500: YES), the memory controller performs a second scheduling associated with the plurality of host commands (step S600). For example, as with step S300, the second scheduling may be performed based on the mapping table and the operation states of the plurality of storage regions. The second scheduling may be performed while the plurality of host commands are executed and, thus, may be referred to as a post-scheduling.

The memory controller re-executes the plurality of host commands based on a result of the second scheduling (step S700). For example, step S700 may be similar to step S400 described with reference to FIG. 9.

When the bank collision does not occur (step S500: NO), the second scheduling may not be performed.

Even though the first scheduling is performed in step S300, the bank collision may occur when the execution order of the plurality of host commands are changed due to specific situations. For example, when another task with high priority is received from the host device and the task with high priority is processed first or when a sudden power-off situation occurs, the execution order of the plurality of host commands may be changed.

In the method of scheduling commands according to example embodiments, an inter-scheduling may be performed while the plurality of host commands are executed. For example, when the bank collision occurs, the second scheduling (e.g., the post-scheduling) associated with the plurality of host commands may be performed based on the operation states of the plurality of storage regions. Accordingly, the bank collision may be prevented and/or avoided and the performance of the memory device may be improved or enhanced.

Figure 17:
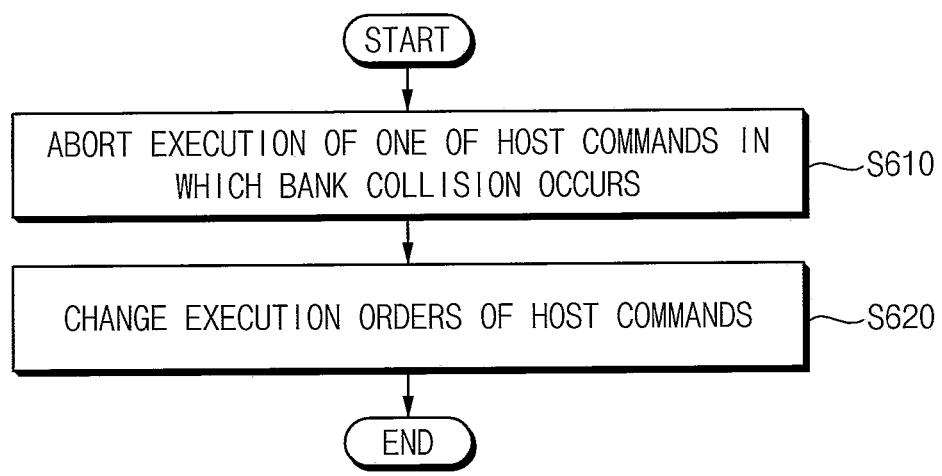
FIG. 17 is a flowchart illustrating an example of performing a second scheduling in FIG. 16.

FIG. 17 is a flowchart illustrating an example of performing a second scheduling in FIG. 16.

Referring to FIGS. 16 and 17, when performing the second scheduling associated with the plurality of host commands (step S600), the execution of one of the host commands in which the bank collision occurs may be aborted or stopped (step S610) and the execution order of the plurality of host commands may be changed (step S620).

For example, in step S610, when the bank collision occurs between a first host command and a second host command among the plurality of host commands, an execution of one of the first host command and the second host command may be aborted. For example, the aborted one of the first host command and the second host command may be a later received (or later executed) one of the first host command and the second host command.

For example, in step S620, the execution order of the first host command, the second host command and a third host command among the plurality of host commands may be changed such that the third host command is executed before the aborted one of the first host command and the second host command is re-executed. The third host command may be received after the first host command and the second host command. For example, an operation of changing the execution order of the first, second and third host commands may be similar to that described with reference to FIGS. 7 and 8. In other words, operations of determining, maintaining, and changing the execution order of the host commands during the second scheduling may be similar to those during the first scheduling.

Figure 18A:
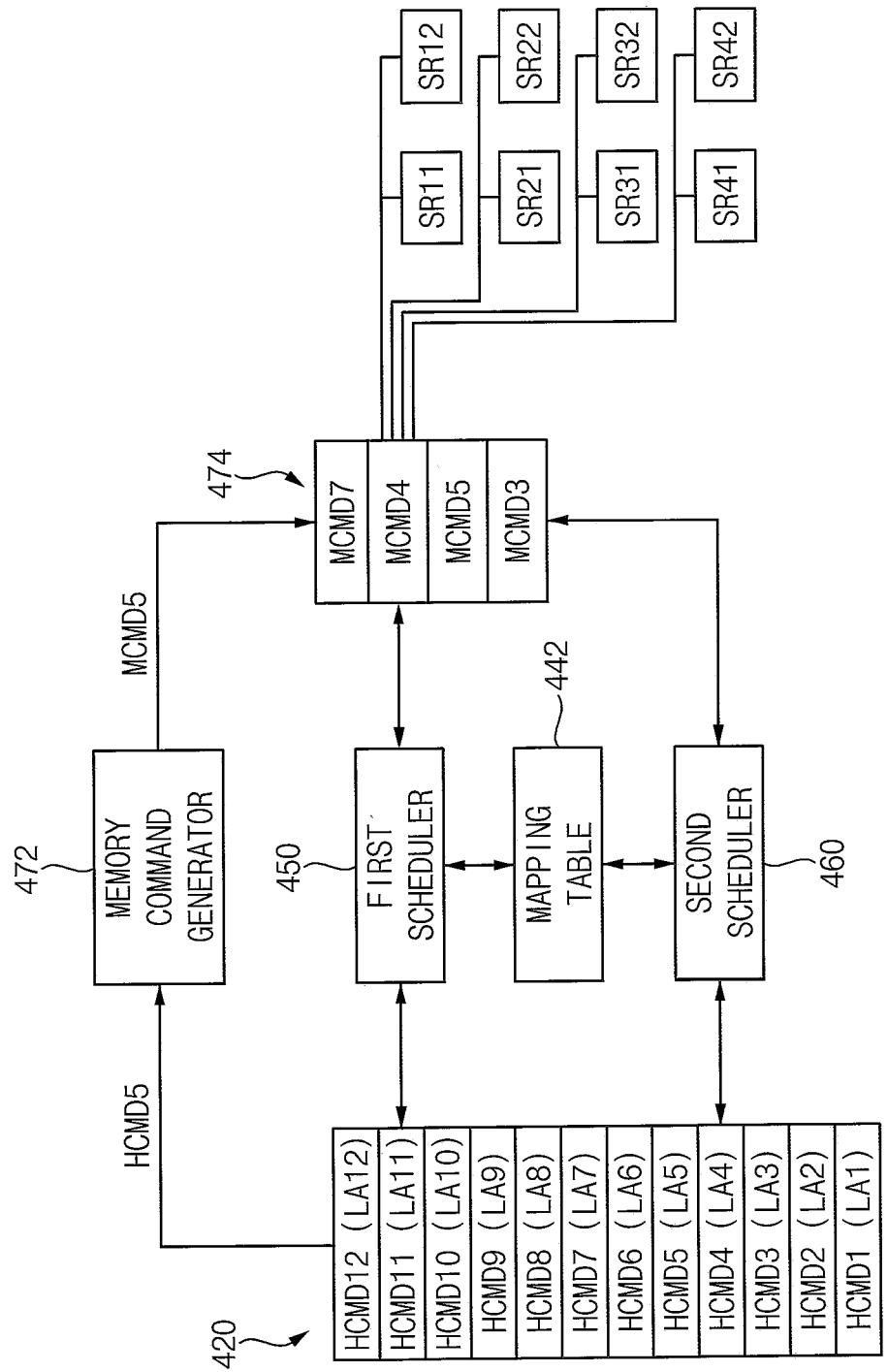
FIGS. 18A, 18B and 18C are diagrams for describing operations of FIGS. 16 and 17.
Figure 18B:
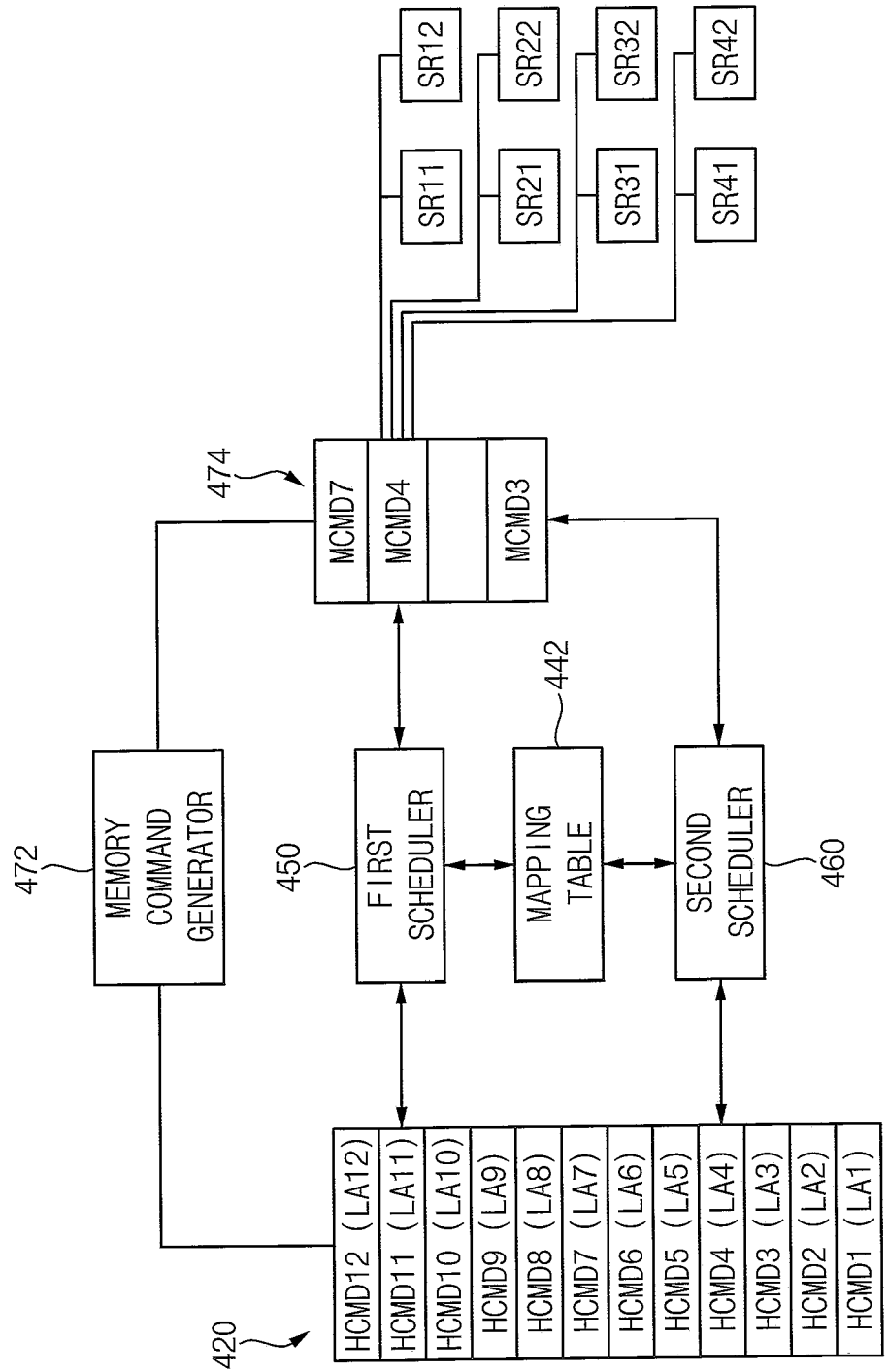
Figure 18C:
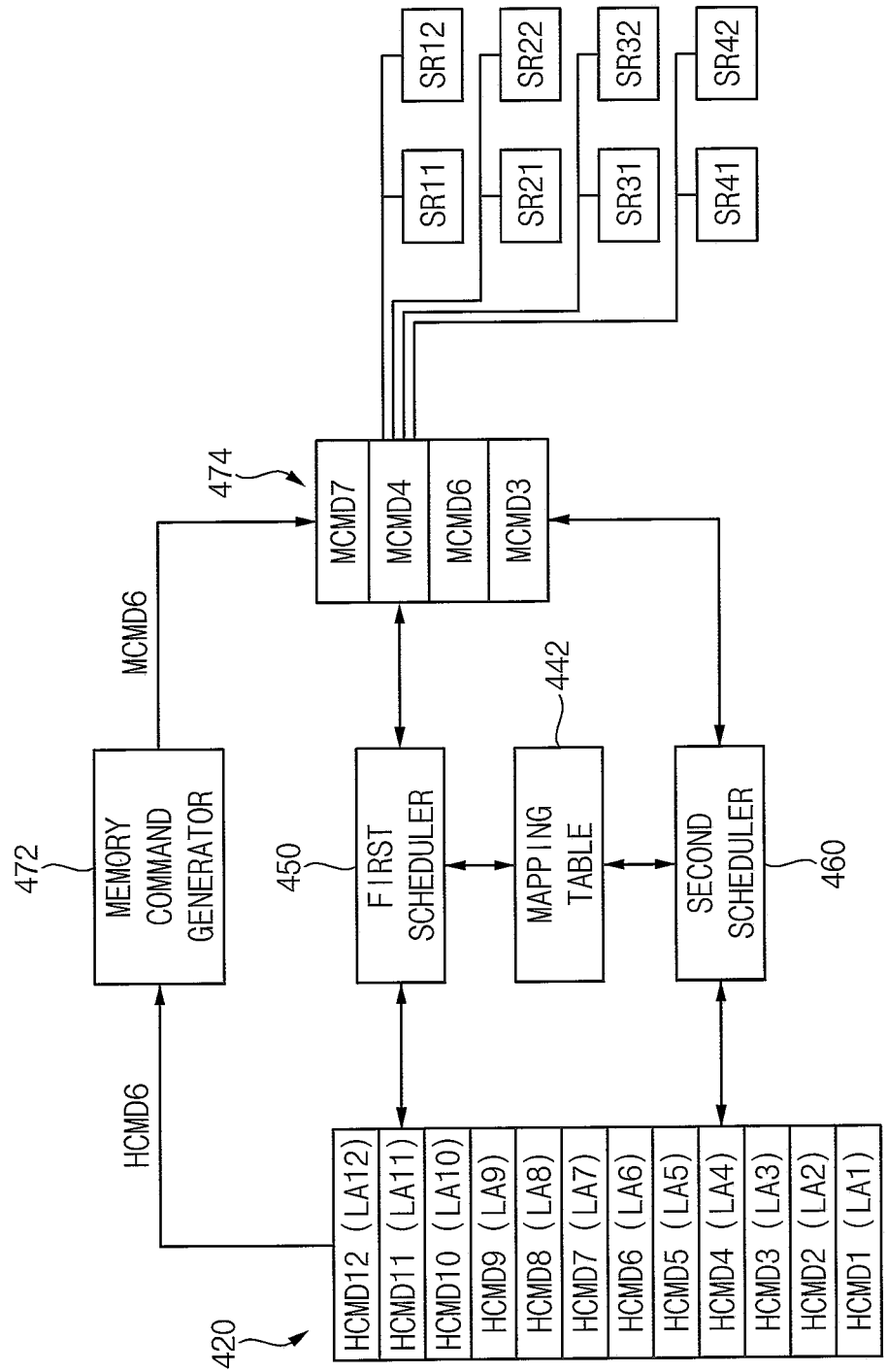

FIGS. 18A, 18B and 18C are diagrams for describing operations of FIGS. 16 and 17. The descriptions repeated with FIGS. 10, 11, 12A, 12B, 12C, 12D, 12E, 12F, 12G and 12H will be omitted.

Referring to FIGS. 18A, 18B and 18C, an example of the second scheduling performed by the second scheduler 460 is illustrated.

FIG. 18A illustrates an example where the fifth host command HCMD5 is executed instead of the sixth host command HCMD6 after the operation of FIG. 12E. For example, the storage regions SR11 and SR12 may not be simultaneously accessed by the third and fifth memory commands MCMD3 and MCMD5 and, thus, the bank collision may occur.

When the bank collision occurs as described above, the second scheduler 460 may abort the execution of the fifth host command HCMD5 that is a later received one among the third and fifth memory commands MCMD3 and MCMD5, as illustrated in FIG. 18B. After that, the second scheduler 460 may schedule the sixth host command HCMD6. Since the storage region SR21 corresponding to the sixth host command HCMD6 has the idle state, the execution order of the sixth host command HCMD6 may be moved forward and the sixth host command HCMD6 may be immediately executed, as illustrated in FIG. 18C.

Although example embodiments are described based on a specific number of host commands, a specific number of memory commands, a specific number of storage regions, a specific number of channels, etc., example embodiments are not limited thereto.

As will be appreciated by those skilled in the art, the disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 19:
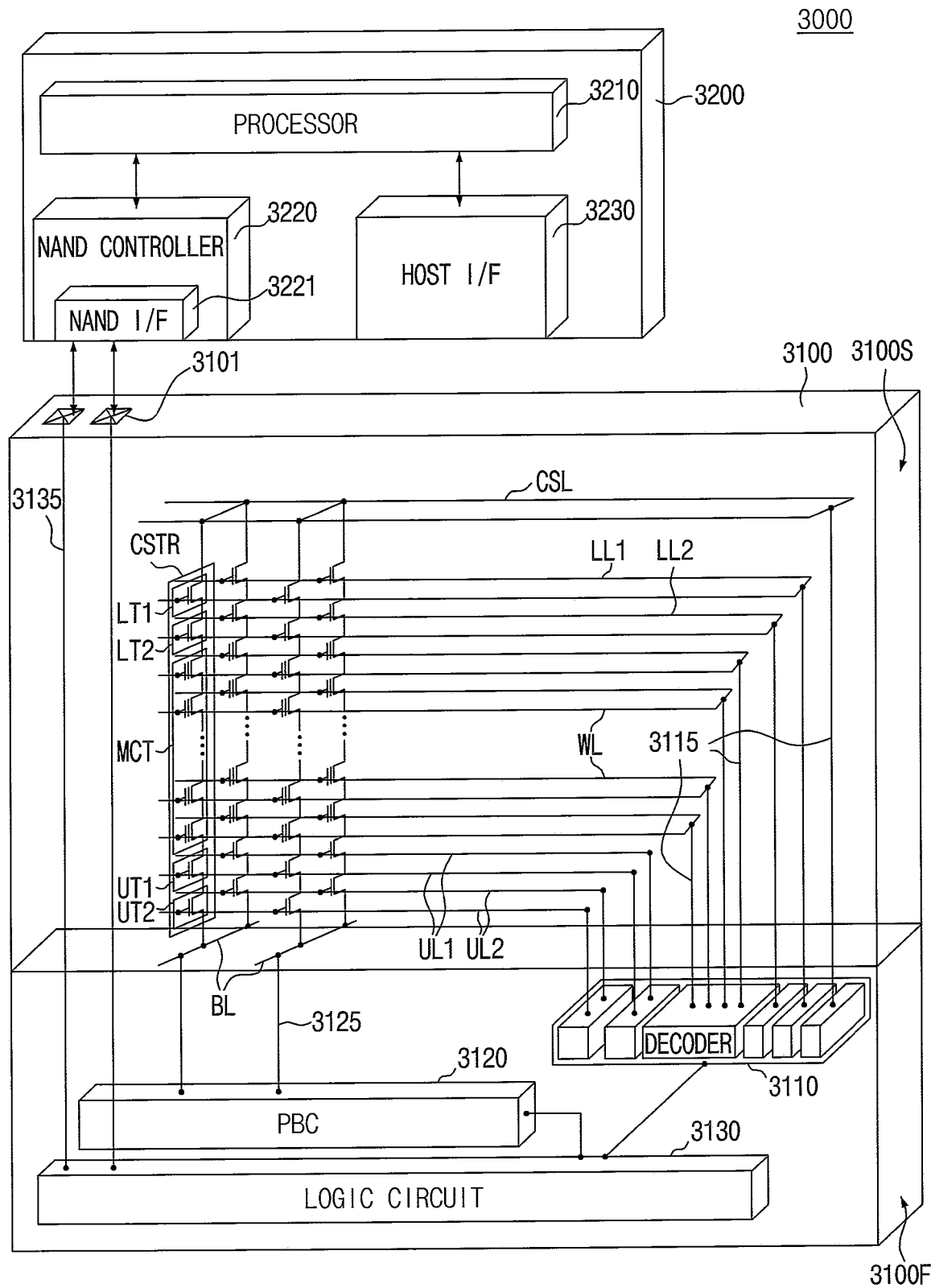
FIG. 19 is a block diagram illustrating an electronic system including a memory system according to example embodiments.

FIG. 19 is a block diagram illustrating an electronic system including a memory system according to example embodiments.

Referring to FIG. 19, an electronic system 3000 may include a semiconductor device 3100 and a controller 3200 electrically connected to the semiconductor device 3100. The electronic system 3000 may be a storage device including one or a plurality of semiconductor devices 3100 or an electronic device including the storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a memory device, for example, the memory device according to example embodiments described with reference to FIG. 5. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including bitlines BL, a common source line CSL, wordlines WL, first and second upper gate lines UL1 and UL2, first and second lower gate lines LL1 and LL2, and memory cell strings CSTR between the bitlines BL and the common source line CSL.

In the second structure 3100S, each of the memory cell strings CSTR may include lower transistors LT1 and LT2 adjacent to the common source line CSL, upper transistors UT1 and UT2 adjacent to the bitlines BL, and a plurality of memory cell transistors MCT between the lower transistors LT1 and LT2 and the upper transistors UT1 and UT2.

In the first structure 3100F, the decoder circuit 3110, the page buffer circuit 3120, and the logic circuit 3130 may correspond to the address decoder 520, the page buffer circuit 530, and the control circuit 560 in FIG. 5, respectively.

The common source line CSL, the first and second lower gate lines LL1 and LL2, the wordlines WL, and the first and second upper gate lines UL1 and UL2 may be electrically connected to the decoder circuit 3110 through first connection wirings 3115 extending to the second structure 3110S in the first structure 3100F. The bitlines BL may be electrically connected to the page buffer circuit 3120 through second connection wirings 3125 extending to the second structure 3100S in the first structure 3100F. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220 and a host interface 3230. The electronic system 3000 may include a plurality of semiconductor devices 3100, and in this case, the controller 3200 may control the plurality of semiconductor devices 3100. The processor 3210, a NAND interface 3221 included in the NAND controller 3220, and the host interface 3230 may correspond to the processor 430, the memory interface 476 and the host interface 410 in FIG. 4, respectively.

The electronic system 3000 may perform the method of scheduling commands according to example embodiments described with reference to FIGS. 1 through 18.

Figure 20:
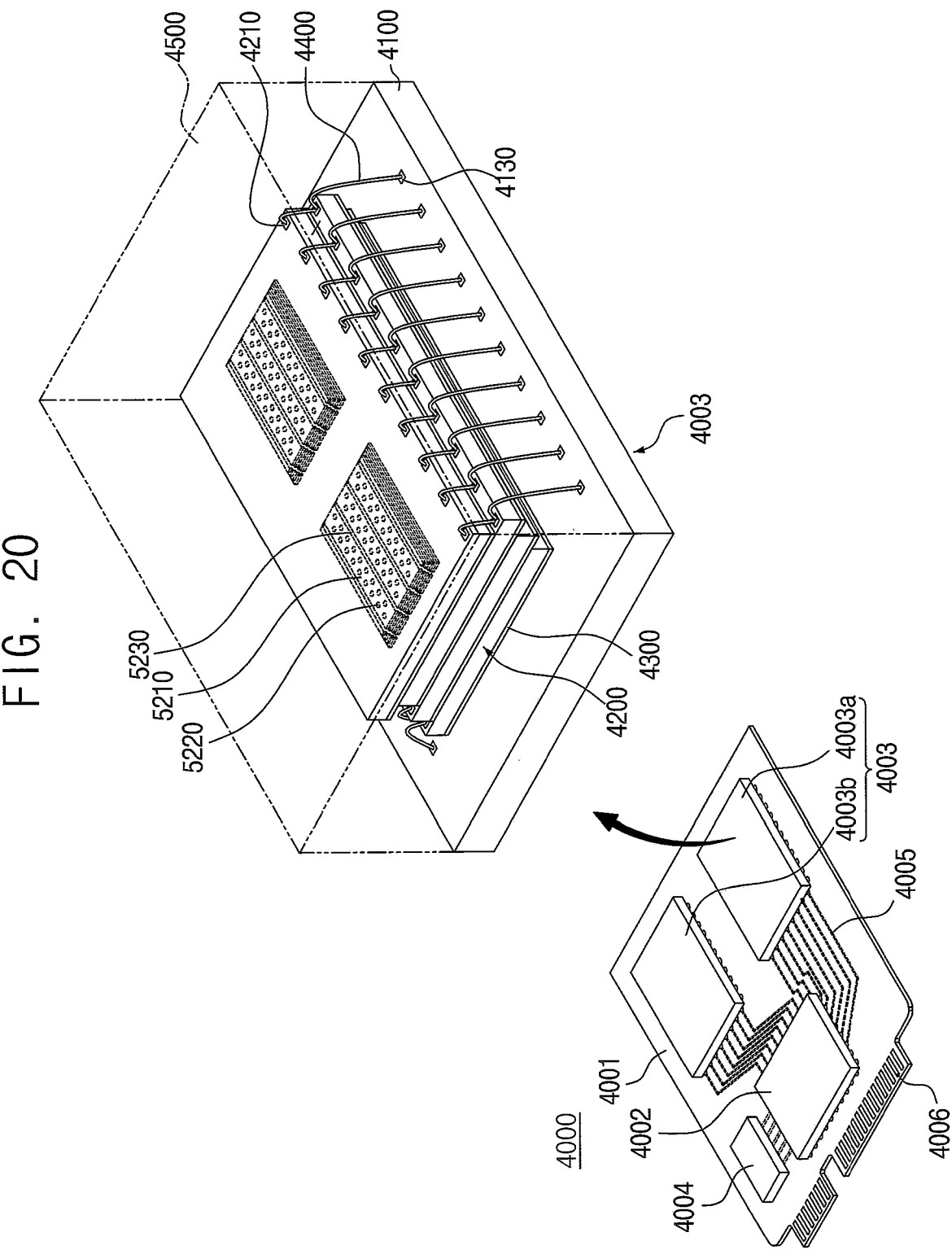
FIG. 20 is a perspective view of an electronic system including a memory system according to example embodiments.

FIG. 20 is a perspective view of an electronic system including a memory system according to example embodiments.

Referring to FIG. 20, an electronic system 4000 may include a main substrate 4001, a controller 4002 mounted on the main substrate 4001, at least one semiconductor package 4003, and a dynamic random access memory (DRAM) device 4004. The semiconductor package 4003 and the DRAM device 4004 may be connected to the controller 4002 by wiring patterns 4005 on the main substrate 4001.

The main substrate 4001 may include a connector 4006 having a plurality of pins connected to an external host. The number and layout of the plurality pins in the connector 4006 may be determined depending on a communication interface between the electronic system 4000 and the external host. In some example embodiments, the electronic system 4000 may be driven or may operate by a power source provided from the external host through the connector 4006.

The controller 4002 may write data in the semiconductor package 4003 or read data from the semiconductor package 4003 and may enhance an operation speed of the electronic system 4000.

The DRAM device 4004 may be a buffer memory for reducing the speed difference between the semiconductor package 4003 for storing data and the external host. The DRAM device 4004 included in the electronic system 4000 may serve as a cache memory and may provide a space for temporarily storing data during the control operation for the semiconductor package 4003.

The semiconductor package 4003 may include first and second semiconductor packages 4003a and 4003b spaced apart from each other. The first and second semiconductor packages 4003a and 4003b may be semiconductor packages each of which includes a plurality of semiconductor chips 4200. Each of the first and second semiconductor packages 4003a and 4003b may include a package substrate 4100, the semiconductor chips 4200, bonding layers 4300 disposed under the semiconductor chips 4200, a connection structure 4400 for electrically connecting the semiconductor chips 4200 with the package substrate 4100, and a mold layer 4500 covering the semiconductor chips 4200 and the connection structure 4400 on the package substrate 4100.

The package substrate 4100 may be a printed circuit board (PCB) including package upper pads 4130. Each semiconductor chip 4200 may include an input/output pad 4210. The input/output pad 4210 may correspond to the input/output pad 3101 in FIG. 25. Each semiconductor chip 4200 may include gate electrode structures 5210, memory channel structures 5220 extending through the gate electrode structures 5210, and division structures 5230 for dividing the gate electrode structures 5210. Each semiconductor chip 4200 may include the memory device according to example embodiments described with reference to FIG. 5.

In some example embodiments, the connection structure 4400 may be a bonding wire for electrically connecting the input/output pad 4210 and the package upper pads 4130.

The memory device according to example embodiments may be packaged using various package types or package configurations.

The disclosure may be applied to various electronic devices and systems that include the memory devices and the memory systems. For example, the disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed and that modifications to the disclosed example embodiments, as well as other example embodiments, are intended to be included within the scope of the appended claims.

What is claimed is:

1. A method of scheduling commands for a memory device including a plurality of storage regions, the method comprising:
   receiving a plurality of host commands used to access the plurality of storage regions from a host device;
   queuing the plurality of host commands in a first command queue;
   performing a first scheduling associated with the plurality of host commands based on a mapping table and operation states of the plurality of storage regions, the mapping table including a correspondence between the plurality of host commands and the plurality of storage regions;
   executing the plurality of host commands based on a result of the first scheduling; and
   in response to a bank collision occurring while the plurality of host commands are executed, performing a second scheduling associated with the plurality of host commands,
   wherein performing the second scheduling comprises changing an execution order of the plurality of host commands such that a later host command, which according to the first scheduling is scheduled to occur after an earlier host command, instead is scheduled to occur before the earlier host command, and
   wherein, during execution of the plurality of host commands based on the result of the first scheduling, execution of the earlier host command is aborted due to the bank collision.

2. The method of claim 1, wherein performing the first scheduling includes:
   checking a first address corresponding to a first host command among the plurality of host commands based on the mapping table;
   checking a first operation state of a first storage region among the plurality of storage regions, the first storage region corresponding to the first address; and
   determining an execution order of the first host command based on the first operation state.

3. The method of claim 2, wherein determining the execution order of the first host command includes:
   in response to the first operation state corresponding to an idle state, maintaining the execution order of the first host command; and
   in response to the first operation state corresponding to a busy state, delaying the execution order of the first host command.

4. The method of claim 3, wherein performing the first scheduling further includes:
   checking a second address corresponding to a second host command among the plurality of host commands based on the mapping table, the second host command being received after the first host command;
   checking a second operation state of a second storage region among the plurality of storage regions, the second storage region corresponding to the second address; and
   determining an execution order of the second host command based on the second operation state.

5. The method of claim 4, wherein in response to the first operation state corresponding to the busy state and the second operation state corresponding to the idle state, the second host command is executed and then the first host command is executed.

6. The method of claim 4, wherein the first scheduling is sequentially performed on the plurality of host commands.

7. The method of claim 1, wherein performing the first scheduling includes:
   checking a plurality of addresses corresponding to the plurality of host commands based on the mapping table; and
   determining an execution order of the plurality of host commands based on the plurality of addresses.

8. The method of claim 7, wherein in response to the number of host commands that are allowed to be executed at one time being X, the execution order of the plurality of host commands are determined such that X adjacent host commands correspond to different storage regions, where X is a natural number greater than or equal to two.

9. The method of claim 7, wherein the first scheduling is simultaneously performed on the plurality of host commands.

10. The method of claim 1, further comprising re-executing the plurality of host commands based on a result of the second scheduling.

11. The method of claim 1, wherein the band collision is between the earlier host command and another host command among the plurality of host commands, and wherein the earlier host command is received later than the other host command.

12. The method of claim 1, wherein the plurality of storage regions is included in a plurality of memory devices.

13. The method of claim 1, wherein the plurality of storage regions is included in a single memory device.

14. The method of claim 1, wherein executing the plurality of host commands includes:
   generating a plurality of memory commands corresponding to the plurality of host commands;
   queuing the plurality of memory commands in a second command queue; and
   executing the plurality of memory commands.

15. The method of claim 1, wherein the memory device includes a NAND flash memory device.

16. A memory system comprising:
   at least one memory device including a plurality of storage regions; and
   a memory controller configured to control an operation of the at least one memory device, wherein the memory controller includes:
   a first command queue;
   a host interface configured to receive a plurality of host commands used to access the plurality of storage regions from a host device and to queue the plurality of host commands in the first command queue;
   a buffer memory configured to store a mapping table including a correspondence between the plurality of host commands and the plurality of storage regions;
   a first scheduler configured to perform a first scheduling associated with the plurality of host commands based on the mapping table and operation states of the plurality of storage regions;

a command executor configured to execute the plurality of host commands based on a result of the first scheduling; and a second scheduler configured to perform a second scheduling associated with the plurality of host commands in response to a bank collision occurring while the plurality of host commands is executed, wherein, to perform the second scheduling, the second scheduler is configured to change an execution order of the plurality of host commands such that a later host command, which according to the first scheduling is scheduled to occur after an earlier host command, instead is scheduled to occur before the earlier host command, and wherein, during execution of the plurality of host commands based on the result of the first scheduling, execution of the earlier host command is aborted due to the bank collision.

17. The memory system of claim 16, wherein the command executor is configured to re-execute the plurality of host commands based on a result of the second scheduling.

18. The memory system of claim 16, wherein the command executor includes:

a second command queue;

a memory command generator configured to generate a plurality of memory commands corresponding to the plurality of host commands and to queue the plurality of memory commands in the second command queue; and a memory interface configured to execute the plurality of memory commands and to transmit the plurality of memory commands to the at least one memory device.

19. A method of scheduling commands for a nonvolatile memory device including a plurality of storage regions, the method comprising:

sequentially receiving a plurality of host commands used to access the plurality of storage regions from a host device;

queuing the plurality of host commands in a first command queue based on a first order;

performing a pre-scheduling associated with the plurality of host commands based on a mapping table and operation states of the plurality of storage regions such that the plurality of host commands have a second order different from the first order, the mapping table including a correspondence between the plurality of host commands and the plurality of storage regions;

executing the plurality of host commands based on a result of the pre-scheduling;

in response to a bank collision occurring while the plurality of host commands is executed, performing a post-scheduling associated with the plurality of host commands based on the mapping table and the operation states of the plurality of storage regions; and re-executing the plurality of host commands based on a result of the post-scheduling, wherein:

performing the pre-scheduling includes:

checking each address corresponding to each host command based on the mapping table;

checking an operation state of each storage region corresponding to each address;

in response to the operation state of each storage region corresponding to an idle state, maintaining an execution order of each host command; and in response to the operation state of each storage region corresponding to a busy state, delaying the execution order of each host command, and performing the post-scheduling includes:

aborting an execution of one of host commands in which the bank collision occurs; and delaying an execution order of the aborted host command.

* * * * *